US006763771B1

(12) United States Patent
Hannecke

(10) Patent No.: US 6,763,771 B1
(45) Date of Patent: Jul. 20, 2004

(54) METHOD FOR PRODUCING ONE-PIECE, THREE-DIMENSIONAL SHAPED BODIES, SHAPED BODIES PRODUCED ACCORDING TO THE METHOD, DEVICE FOR CARRYING OUT THE METHOD, AND DISPLAY FURNITURE

(75) Inventor: Wolf-Dietrich Hannecke, Northeim (DE)

(73) Assignee: Wolf-Dietrich Hannecke Kunststofftechnik, Northeim (DE)

( * ) Notice: Subject to any disclaimer, the term of this patent is extended or adjusted under 35 U.S.C. 154(b) by 0 days.

(21) Appl. No.: 09/831,251
(22) PCT Filed: Nov. 3, 1999
(86) PCT No.: PCT/EP99/08409
§ 371 (c)(1),
(2), (4) Date: May 7, 2001
(87) PCT Pub. No.: WO00/27613
PCT Pub. Date: May 18, 2000

(30) Foreign Application Priority Data

Nov. 5, 1998 (DE) .......................................... 198 51 040
Nov. 5, 1998 (DE) ..................................... 298 19 802 U

(51) Int. Cl.⁷ .............................................. A47B 13/00
(52) U.S. Cl. ...................................................... 108/161
(58) Field of Search ............................. 264/239; 227/4, 227/20; 428/35.7, 35.2

(56) References Cited

U.S. PATENT DOCUMENTS 3,528,158 A * 9/1970 Black et al. .................... 227/4
5,820,718 A * 10/1998 Dean .......................... 156/211
6,193,311 B1 * 2/2001 Payton ................... 297/256.15
6,485,666 B1 * 11/2002 Rowley ....................... 264/506

* cited by examiner

Primary Examiner—Jose V. Chen
(74) Attorney, Agent, or Firm—Schmeiser, Olsen & Watts

(57) ABSTRACT

The disclosure relates to a method for producing one-piece, three-dimensional shaped bodies, shaped bodies produced according to the method, and a device for carrying out the method. The aim is to simplify the production of one-piece, three-dimensional shaped bodies which can be easily produced. To these ends, the disclosure provides that a plate which is resistant to bending at room temperature is heated only in heating regions along deformation lines, especially bending lines, and is subsequently deformed freely in space, i.e. without the use of a stop edge, indentation, template or die, whereby the attained three-dimensional shape is permanently preserved after cooling during which the material blank is kept.

18 Claims, 23 Drawing Sheets

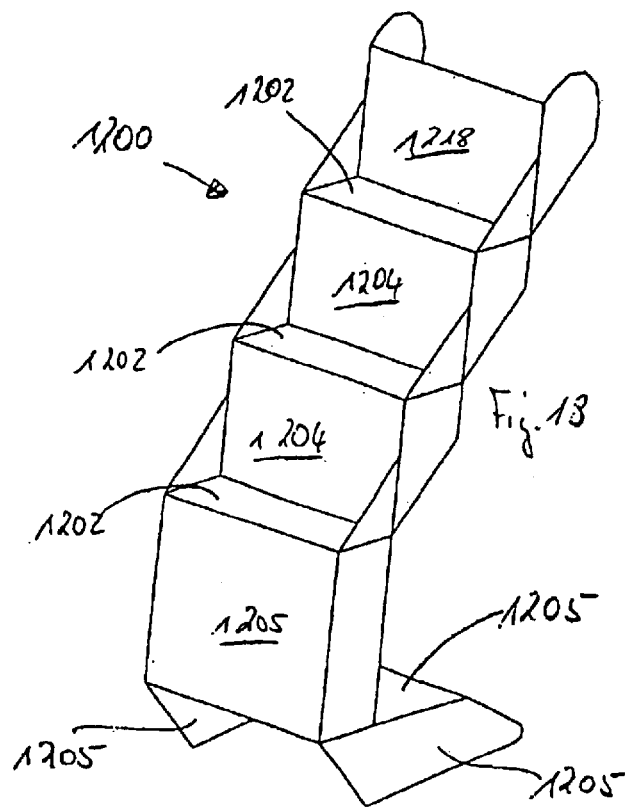
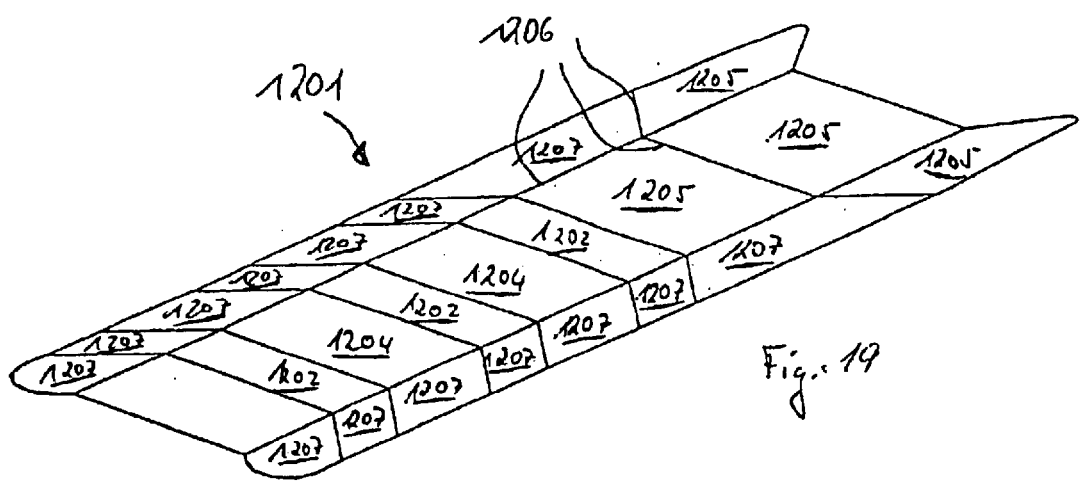

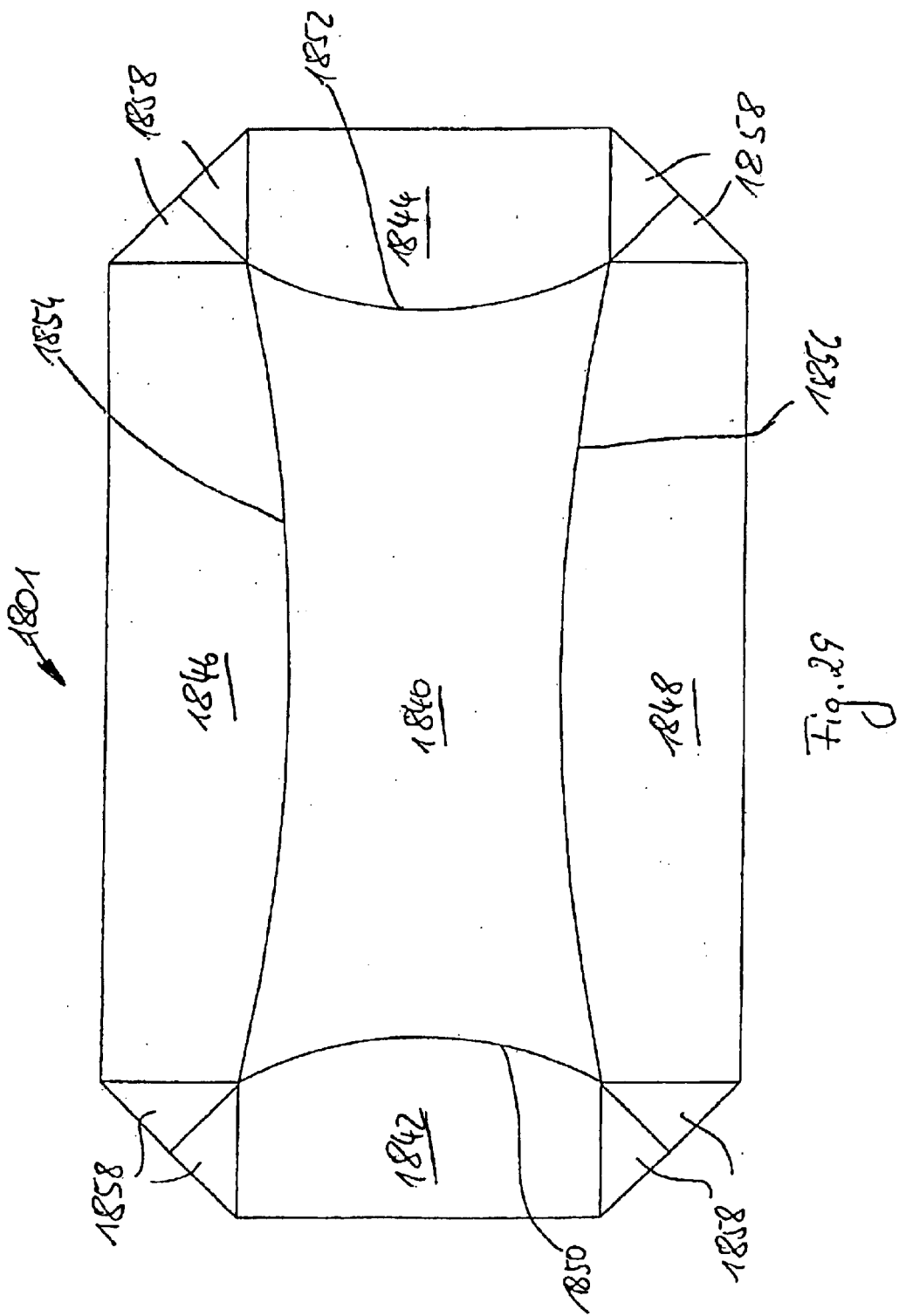

METHOD FOR PRODUCING ONE-PIECE, THREE-DIMENSIONAL SHAPED BODIES, SHAPED BODIES PRODUCED ACCORDING TO THE METHOD, DEVICE FOR CARRYING OUT THE METHOD, AND DISPLAY FURNITURE

The invention relates to a method for producing one-piece, three-dimensional shaped bodies, shaped bodies produced according to the method, a device for carrying out said method, as well as display furniture.

Industrially or manually prefabricated one-piece shaped bodies of the most varied materials have always been used in almost all technological fields. Such shaped bodies may either be functional individual objects ready for use, or constructional or component parts for more or less complexly structured devices or equipment. Especially in recent times, engineers have again directed their efforts increasingly towards developing modular systems for which complex devices or equipment are assembled from individual shaped bodies which should be as universally usable as possible, and for which the number of shaped bodies or modules of different design should be kept as small as possible. Primarily, this is intended to reduce both the number of specific, labor-intensive and thus costly shaping processes as well as the work and expenses required for storing and parts supply.

Finished shaped bodies may be the result of various original shaping processes in which—by definition—a solid body is formed from a shapeless material by creating a coherence. Another way of attaining a certain shaped body is to use various methods for re-forming or deforming semi-finished parts created by way of deformation. These latter methods include, amongst others, the deformation, by bending, of flat, plate-shaped work-pieces. Depending on the type and cross-section of the starting material used, and as a function of the bending radius to be achieved, cold or hot forming processes will be used. Shaped parts of a thermoplastic material formed by bending, for example, are generally produced by way of hot forming in a die, owing to their bending resistance once cooled down.

Finished shaped bodies in demand on the market are in particular display furniture items for the sales-promoting presentation of goods, covers or covering caps for covering display surfaces of a display furniture item as well as legs for supporting a post of a display furniture item.

From practice, various designs or shapes of display furniture items are known, the production of which, however, generally comprises various separating, deforming and joining steps. This makes the production of the prior art display furniture material- and time-intensive.

It is further disclosed in GB 1 603 489 to make a collapsible boat or other three-dimensional objects from a thermoplastic material blank by heating region by region of said material and bending it along edges predetermined by templates. This method is identically disclosed in DE 28 22 218 A1. It is furthermore known from the teaching of EP 0 022 884 A1 to create a three-dimensional body by deforming a metal sheet. However, it is neither disclosed in EP 0 022 884 A1 nor in GB 1 603 489 how to form or produce a display furniture item for the sales-promoting presentation of goods. What is set out in the following concerning the prior art is intended to relate to shaped bodies made of thermoplastic plastics as well as to methods for producing such shaped bodies. However, the problems and shortcomings to be set out hereinafter are in principle also encountered with any shaped parts formed by bending and made of materials which can be deformed under the influence of heat as well as the respective deformation methods used for this purpose.

Owing to their material properties, shaped bodies made of thermoplastic plastics are extremely versatile as regards their applications. With the traditional materials such as wood or metal being increasingly replaced with other materials, shaped bodies of both simple and complex designs are now commonly produced from thermoplastic plastics. Just like their application range, the variety of shapes of these bodies has increased to a vast extent. Nevertheless, the one-piece shaped bodies made of thermoplastic plastics hardly ever include any objects of excessive dimensions or objects of hollow or vessel-like shapes, except for, perhaps, long and hollow extruded sections such as pipeline parts. As will be illustrated in the following, a major reason for this is that the prior art methods are not suitable for the small-scale series production of shaped bodies of a certain geometrical design.

Depending on the three-dimensional shape to be attained and the semi-finished part or starting material that can be used for this purpose, different methods are employed for producing thermoplastic shaped bodies. Besides the original shaping methods of the prior art, which include the production of endless extruded sections, the widely used injection molding technique or also the further developed injection-blow molding technique, numerous forming methods are known. These latter methods may be differentiated according to the type of starting materials to be formed or deformed. However, what is set out hereinafter with respect to the prior art shall be restricted to the hot-forming methods of the prior art for processing thermoplastic plates.

A relatively simple method for producing likewise simple shaped parts of thermoplastic plastics formed by bending is the essentially manual hot forming method by means of a glow wire device or a so-called folding or bending device. In this case, a plate of thermoplastic plastic is rapidly and uniformly heated to the temperature of optimum thermoplastic behavior along a linearly extending heating region of a bending, buckling or folding line, and subsequently—under the influence of mechanical forces—bent, buckled or folded along the heated bending, buckling or folding line until a desired angle has been attained. A cooling step will ensure that the new shape is fixed automatically. The devices used for performing the method usually comprise a support device for the work-piece to be deformed, said device reflecting the bending line, as well as a linearly extending heating wire or heating rail mounted underneath said device. An elbow part produced from a thermoplastic plate may for example be subjected to further processing steps on said folding or bending device machine for obtaining a finite U-shaped or stepped beam. While this method does require a folding or bending device, its advantage is that it can do without shaping tools reflecting the exact shape and that the work-piece to be deformed need merely be subjected to a linear partial heating step.

It is self-evident that the range of possible shapes of shaped bodies produced in this manner is limited. It is not possible, for example, to produce simple containers without gluing or welding together, in a subsequent working step and, if necessary, including intermediate machining steps, the semi-finished products produced by means of a glow-wire device. A device involving a glow wire and a method adapted thereto are disclosed in DE 1 038 749 A1. The disadvantages of this approach are last but not least that it produces seams with material properties that may be undesired or difficult to foresee. If shaped bodies of transparent plastic are joined e.g. by gluing or welding them together, this will furthermore have a detrimental effect on the esthetic appearance of the body obtained in this manner since light will be refracted irregularly and sometimes strongly in the area of said seams.

So far, it has only been possible to avoid such disadvantages if any complex three-dimensional shapes (e.g. containers or the like) are produced by means of by far more laborious methods. Such methods include the blowing or suction methods involving high or low pressure which allow the deformation of thermoplastic plates heated over their entire surface into bowl-like or dome-shaped parts in a mold. Since forming tools are costly in production, producing shaped bodies in this manner will only be worthwhile if large series are produced.

One disadvantage inherent to all methods used for deforming plates heated over their entire surface areas is that the entire surface area to be deformed must be heated to the processing temperature, no matter whether or not a shape or surface already present in the semi-finished product may also be partially used for the resulting shaped body. This mainly applies to the case where prefabricated plates made of thermoplastic plastics are used as starting material and deformed by means of the vacuum molding process. Moreover, large area heating and deformation will almost always result in the walls of the produced shaped body being reduced in thickness at numerous sites. This fact will have to be taken into account specifically for each new shape.

GB 1 603 489 discloses a process in which a collapsible boat or other three-dimensional objects are produced from a thermoplastic blank by merely heating regions thereof and bending the material along edges predetermined by means of templates. This method is identically disclosed in DE 28 22 218 A1. It is furthermore known from the teaching of EP 0 022 884 A1 to create a three-dimensional body by deforming a metal sheet by means of a template.

It is the object of the invention to simplify the production of one-piece, three-dimensional shaped bodies as well as to provide three-dimensional shaped bodies, in particular display furniture, which can be easily produced.

This object is accomplished according to the invention by the features of claims 1, 14, 16, 18, 29, 32, and/or 34.

The invention provides that a plate which is resistant to bending at room temperature is heated only in heating regions along deformation lines, especially bending lines, and is subsequently deformed freely in space, i.e. without the use of a stop edge, template or die. Since free deformation processes, in particular bending, will not require the use of a die or template, this makes them suitable also for small-scale series production. One advantage of free deformation processes is that the material will be treated gently since tools will only be used in those areas where the material has the properties that make it resistant to deformation at room temperature, and consequently, the finished product will not show any tool marks. This free deformation in space during which the material will assume a geometric structure of the least interior tension, will also allow shapes with plural bending lines to be produced in one deformation step.

In the method of the invention, which reminds one of origami-style folding, certain deformation regions of the material blank are merely softened by heating, followed by a folding step under the influence of a force acting on individual portions of said material blank. The three-dimensional shape resulting from the folding step will be kept until the heated areas of the material blank have cooled down again and have become dimensionally stable. It should be mentioned here that force need not be applied to all partial surfaces since the coherent strength of the material will also allow changing the spatial relationship, relative to other partial surfaces, of any such partial surfaces that have no force acting on them.

Free bending in space along plural bending lines in one working step constitutes one preferred embodiment of the invention. In this case, the bending lines on the material blank may contact, intersect, or extend totally independently of, each other, with curved bending lines also being possible for generating a certain three-dimensional shape.

If the bending lines extend in the form of curves, this will result in shaped bodies with curved surfaces having a high dimensional stability. The more frequently secants of the bending lines intersect within a defined work surface, and the further scattered these intersecting points are on said work surface, or the larger the section of the work surface that is covered with intersecting points is, the more dimensionally stable and the more capable of bearing diverse loads will the resulting shaped body be in general. This fact may be ideally exploited for designing shaped bodies capable of bearing extreme loads which are light-weight and ipso facto simultaneously easy to produce. Owing to the extraordinary variety of shapes possible with the shaped bodies according to the invention, a corresponding multitude of specific advantages will also become apparent when one examines individual examples of such shapes. Further comprehensive advantages of the shaped bodies of the invention as well as of the method for their production are that wherever conventional shaped parts formed by bending or semi-finished products had to be screwed, glued or welded together in time-intensive manual work processes in the past, such work will in many cases no longer be required in the future since it will be possible to produce and use complex designs as finished one-piece shaped bodies according to the invention without major production work and expenses. Containers produced in accordance with the method of the invention moreover exhibit the advantage of being inherently liquid-tight, i.e. not requiring an additional welding step. The geometry of the finished shaped body essentially depends on the material properties of the thermoplastic plate, the course and arrangement of the deformation curves, the bending radius in each point of the deformation curve as well as on the width of the heating region, the heating temperature and the duration of the heating step.

As was already indicated above, the advantages of the invention are not exclusively restricted to the technical and esthetic value of the shaped parts formed by bending according to the invention. Crucial advantages are also inherent to the method for their production. As was likewise already set out above, deformation processes involving bending steps have hitherto played a relatively minor role in the manual processing of thermoplastic semi-finished products. However, in many cases, the shaped parts formed by bending according to the invention are suitable for replacing shaped bodies of thermoplastic material which are the result of shaping processes that do not involve bending and that are far more labor-and time-intensive from a technical point of view. The production of shaped bodies of the invention is therefore considerably less expensive and a small-scale series production of these bodies is thus also more economical than that of comparable shaped bodies produced by means of the aforementioned original shaping methods, since no specific forming tools are required for producing the shaped bodies of the invention as opposed to the above-mentioned prior art forming methods, and it is also unnecessary to heat the entire semi-finished plate to the bending temperature. The cost and time advantage is particularly significant in the case of large-surface plates.

As a rule, suitable starting materials for the shaped bodies of the invention and the method for their production are all those materials which may be shaped as plates or flat bodies and exhibit thermoplastic properties so as to ensure that the semi-finished products can be deformed under the influence of heat. Consequently, the shaped bodies or the plates to be deformed in accordance with the method of the invention may either be made of a homogeneous material or also of a composite material. An exemplary list of such materials includes in particular thermoplastic plastics, sheet metals, flat glass, wax, wood as well as diverse composite materials which are capable of being deformed under the influence of heat. The preferred starting material is thermoplastic plastic of any kind, expressly including the composites on the basis of thermoplastic plastics. What comes to mind in this context are e.g. metal- or glass-fiber reinforced plates of thermoplastic plastic, or plastics having an integrated organic fiber content.

While for the hot-forming bending of plates of thermoplastic material, the bending edges have always been laid out along straight extending, i.e. linear deformation curves, it has now turned out that plates of thermoplastic material may also be bent if the deformation curves do not extend linearly but rather in the shape of e.g. a curve or in zigzag. Bending steps may even be performed if plural deformation curves intersect or contact each other within the plate to be deformed. The shaped bodies resulting from a corresponding bending of plates with intersecting or contacting deformation curves have bending edges which form corners and define angles between each other.

Depending on the course and array of the deformation curves on which a specific shaped body is based, a distinction can be made between shaped bodies in which the surfaces which are not exposed to heating during deformation and which are tension-free will still be planar and tension-free following deformation, and shaped bodies in which said surfaces will exhibit a material tension after deformation which will generally manifest itself in the form of a clear curvature of the surface in question. Material tensions and/or curvatures in the partial surfaces of the shaped body of the invention which were not subjected to thermal deformation will occur whenever such a partial surface, which is at least partially delimited by one or plural bending edges, is forced—by these very bending edges—into a smaller plane than would correspond to the actual extent of said partial surface, were it spread out flatly. If the individual partial surfaces of the shaped body of the invention are to totally lack any said material tensions, this can only be accomplished if the individual deformation curves intersecting each other in at least one instance each extend linearly.

However, as soon as a portion of a deformation curve which is not intersected by any other deformation curve extends as a finitely or infinitely finely subdivided open polygon, once the bending has been completed, the thermoplastic plate will exhibit a more or less pronounced curvature on either side of the respective resulting bending edge each. If said open polygon defines a simple arc, the resulting shaped body will exhibit both a convexly delimited concave partial surface and a concavely delimited convex partial surface.

If an infinitely finely subdivided open polygon is composed of two arcs extending in opposite directions, then the two partial surfaces delimited by the resulting curved bending edge which may extend in the form of a tangential or cotangential curve, will each exhibit fluidly merging concave and convex sections.

Owing to the different elastic properties of the starting material used in each case, the surface lines of the concave or convex surfaces will extend to a more or less curved extent, with the curvature radius changing constantly. This means that in the immediate vicinity of the bending edge, the curvature of a respective partial surface will still reflect the curvature radius of such bending edge, but will subsequently decrease steadily with increasing distance from said bending edge. The smaller the elasticity defined by the thickness of the material and of the plate, the faster the curved surface will become planar again.

If shaped bodies exhibiting such curvatures are desired for esthetic or technical reasons, then these curved shaped parts formed by bending will have the advantage of higher stability over conventional curved shaped parts of identical wall thickness, since the curved region of the shaped body of the invention will be permanently pre-stressed. Such inherently stable curved shaped bodies may be advantageously used in many applications. As an example, applications in car body construction or also in building or roofing should be mentioned here.

The aforementioned tension forces which in many cases result from the course and the array of the deformation curves will not only lead to a cold elastic deformation of the partial surfaces not heated during the bending deformation step, but will, moreover, also have a direct influence on the hot deformation along the deformation lines. Thus the tension forces acting on the part may exert a certain influence on the bending edges which will in turn depend on the material used, the selected temperature as well as the width of the heating region extending along a deformation curve. Of practical importance in this respect is above all the chosen width of the heating region, since narrowing or widening this region alone will already have a notable effect on the geometrical shape of the bending edges. For example, if at a bending edge the width of the heating region varies within one and the same deformation curve, it may be advantageous if the plate material is additionally cooled in the regions adjacent the actual heating region. As a rule, the corners and edges of a shaped body will automatically become more rounded, the wider the heating region is. The effects of the tension forces caused by the elastically cold-formed partial surfaces range from upsetting deformations, extensions to shearing in the area of the bending edges, and may be deliberately avoided or also specifically caused, depending on the demands made on the finished shaped body. Cleverly positioned upsetting deformations may e.g. turn into desired reinforcement ribs or serve to optically highlight certain parts or portions. Especially strong extensions may on the other hand produce folds which will ultimately appear as U- or omega folds. It is self-evident that such deformations may also be created at the bending edges by triggering off the required tension forces through pulling or pressure forces made to act on the external edges of the semi-finished products during the bending deformation step. Characteristic embodiments of the bending edges may serve particularly advantageously as integrated functional elements of shaped bodies. For example, deliberately caused material upsetting deformations or extensions may function as cable channels, as drains, as negative profiles for snap or plug connections and as introduction or feed profiles for pipings or sealing profiles.

For deliberately forming specific bending edge profiles, the method of the invention may advantageously be combined with a pressure deformation process using one or plural rams. In this way, certain cavity shapes may be formed in the shaped part by additionally deforming the desired area of the heated bending region by means of said rams.

The thermoplastic plates used as the starting material for the shaped bodies of the invention will not necessarily have to have a smooth surface for the method to be performed successfully. Semi-finished products having a certain surface profile on one or either side may also be used without difficulty for this purpose. If necessary, the varying plate cross-section may be taken into account by correspondingly adjusting the heating temperature.

Another advantage of the production method of the invention is that plates which already include recesses may also be readily deformed by bending. By contrast, perforated plates which exhibit a grid or pattern of punched or pierced apertures may not be deformed by means of methods in which the semi-finished products are pressed onto the forming tools in a vacuum- or compressed-air pressure chamber or also by means of a liquid. Providing recesses in finished and geometrically irregular shaped bodies at a later time, by sawing out, cutting out, punching out or melting out, will not only be laborious and time-consuming but will usually also result in energy and material losses since the cut-out portions will either have to be recycled or rejected. Even simple bores for the assembly of component packages or the like may be substantially more easily provided in planar surfaces, since a three-axle boring mill can be used for this purpose instead of a five-axle boring mill otherwise required. Moreover, compared to the conventional shaped bodies which were provided with the recesses only after the deformation process, the shaped body produced in accordance with the invention and provided with recesses or a grid has the advantage that the edges of the recesses can be rounded off or formed in any other specific way much more easily, depending on the design and dimensions of the basic plate.

Also for printing, engraving or milling purposes, the method of the invention can be considered superior to the prior art deformation processes since in this case, too, the entire processing of the plate may be carried out before the deformation process, i.e. in the planar state of the plate.

The possibility of processing the plates before the actual deformation step is advantageous especially where the shaped body is to function as a device support since the assembly of component packages can be done much more easily in the planar state of the plate, and it may even be possible, if necessary, to produce shaped bodies from which a component package mounted thereon cannot be removed again later.

For concretely performing the method of the invention, different devices may be used, depending on the desired degree of automation, with at least one heating means being required which can be used for heating thermoplastic plates along one or plural deformation curves.

In the simplest case, the heating means will include firmly installed heating rods or heating pipes which extend along the deformation curves. In an advantageous embodiment, the heating rods or heating pipes are in the form of individual heating elements which may be installed on one and the same heating means in an array which may essentially be freely chosen. In this manner, a number of heating elements of identical or also different types may be used to produce a plurality of different shaped bodies by means of a single device. It is furthermore considered advantageous to provide support means which can be used to fix the plate to be heated on the heating means. If the support means is e.g. suspended from a traveling trolley or a carriage, then the plates to be deformed may be taken into the material stock, subsequently be moved to the heating means and be brought into position there.

If a material blank has plural bending lines subdividing said material blank into plural regions, it will not be necessary during the deformation step to have a force acting on each such region of said material blank. This is due to the fact that the cohesive strength of the material will allow the spatial position of a region of a material blank to be changed without a force having to act on said region.

For generating linearly extending bending edges, the material blank will have to be heated only along a narrow heating region. However, if extensions or embossing zones are to be generated, a wide heating region of the material will preferably have to be heated in order to achieve an as small as possible fluctuation of the material thickness. In the method of the invention, the width of the heating region can moreover be used for specifically setting the bending radii and roundings of corners.

The method of the invention allows the processing of thermoplastic plastic material of a thickness of between 3 mm and 10 mm. Consequently, shaped bodies may be produced which exhibit a high inherent strength. As a result, shaped bodies and display bags of the invention are characterized by a wall thickness of between 3 mm to 10 mm, especially 6.5 mm and 4 mm, respectively. In this context, another advantage of the method is that only a relatively small amount of energy is required for producing said shaped bodies.

Another aspect of the invention provides that in a display furniture item including at least one display surface and at least one support surface adjoining said display surface for positioning said display surface, these surfaces are provided as one piece and spatially staggered from each other by bending a material blank which was heated only along at least one bending line.

Preferably, said display furniture item is produced by free bending in space, i.e. without the use of templates or dies. In such case, the display furniture item will not show any traces of a force acting on it since the force was only introduced in areas which had not been heated and thus were able to resist the force, and—depending on the course of the heat acting on the material—the edges will be finely rounded with a large or small radius, free of any tool marks.

A deformation along plural bending lines in one working step, as it is possible with the display furniture item of the invention, will reduce the required number of handling steps and thus diminish production time and manufacturing costs.

Preferably, the display surface and the support surface are formed in a bottom element of a shelf which is provided between two spaced posts. In this case, said shelf bottom preferably consists of an essentially rectangular material blank which has been bent in a desklike shape along a first bending line extending in parallel to one of the material edges and along further bending lines so as to subdivide said first bending line into three sections, the first and third of which extend essentially in parallel, including an essentially right angle each with respect to said second section.

In another preferred embodiment of the invention, said display furniture item takes the form of a display stand or rack with a foot formed as one piece with the display surface and the support surface, with said display surface, said support surface and said foot having been formed by bending a material blank which had been heated only along bending lines.

Yet another aspect of the invention proposes a covering cap for covering a display surface of a display furniture item, including at least one cover surface and at least one support surface adjoining said cover surface, said cover surface and said support surface being formed as one piece and being spatially staggered from each other by bending a material blank which had been heated only along bending lines. From an esthetic point of view, it is considered especially advantageous if the cover surface has two support surfaces formed symmetrically to the central plane of said cover surface, with the bending line formed between said cover surface and one support surface each extending in a curved manner, resulting in a cover surface of a concave or convex curvature.

Said display furniture item, said covering cap and said foot preferably consist of a material blank of a transparent material, in particular polymethylmethacrylate which deliberately only has its internal or bottom side imprinted on or coated. The fact that only one side is imprinted on or coated will facilitate production since the force required during deformation can thus be made to act on the side which has deliberately been left untreated. This will avoid any processing marks or traces which would otherwise result during production. Moreover, imprinting on or coating only one side of a material blank will prove advantageous in use since scratch marks and the like can only appear on the un-imprinted side of the transparent material and will thus be essentially invisible. Any contamination of the coating or the printed section will also be prevented.

Other advantageous embodiments as well as further developments of the invention may be gathered from the sub-claims as well as the description taken in combination with the drawings which follow, of which:

Figure 8:
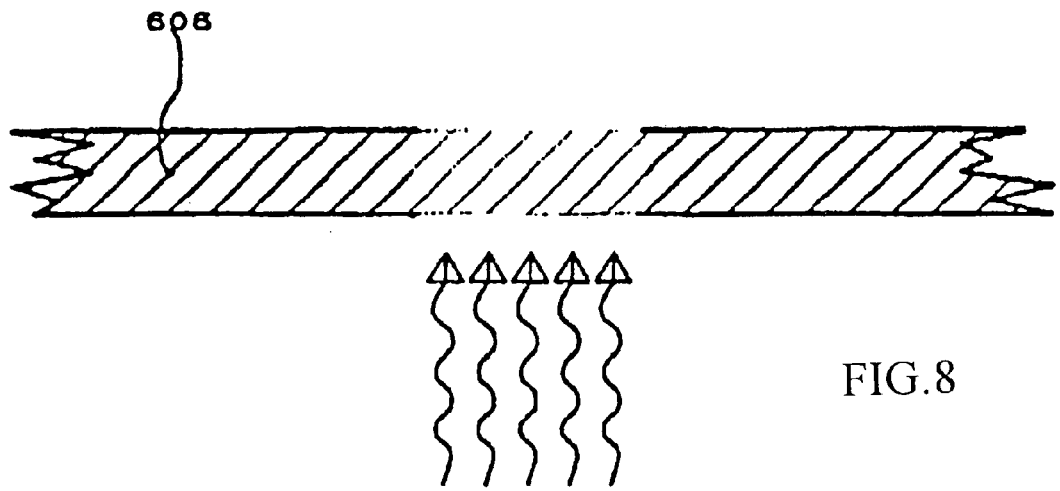
Figure 9:
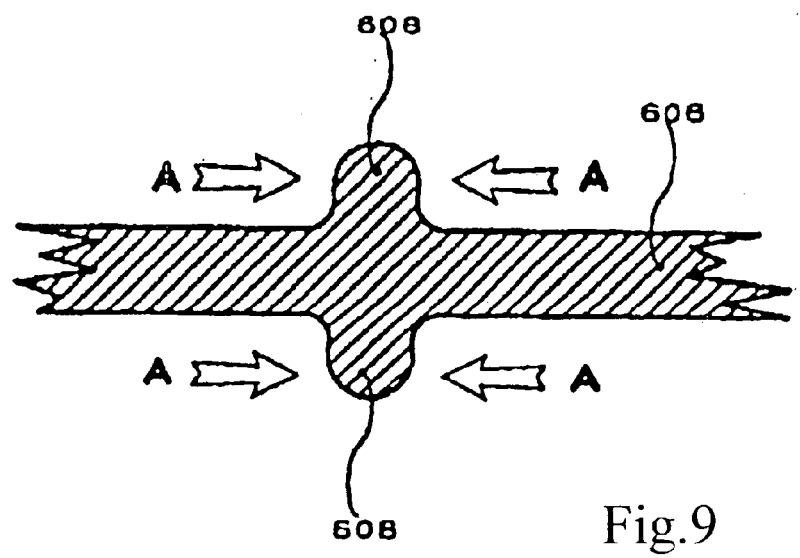
Figure 10:
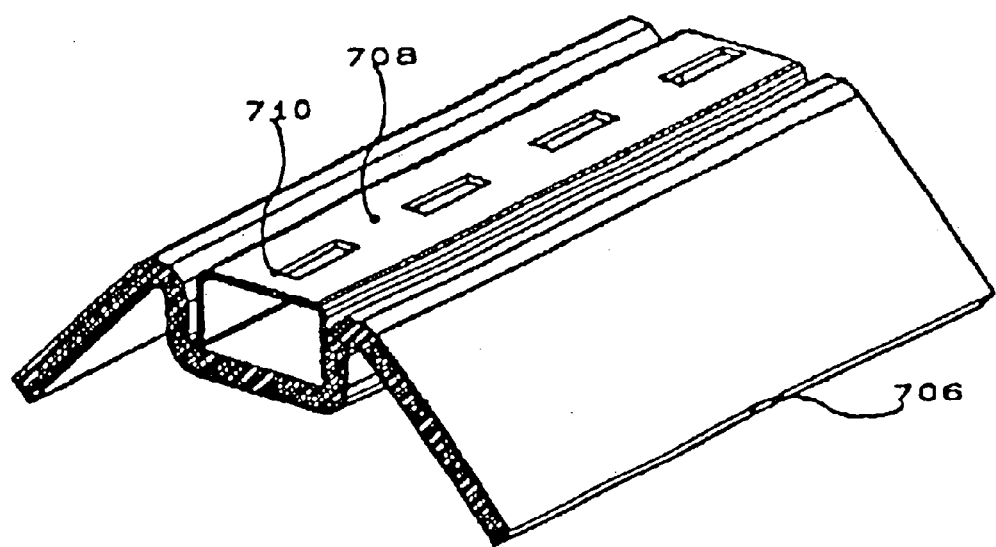
Figure 11:
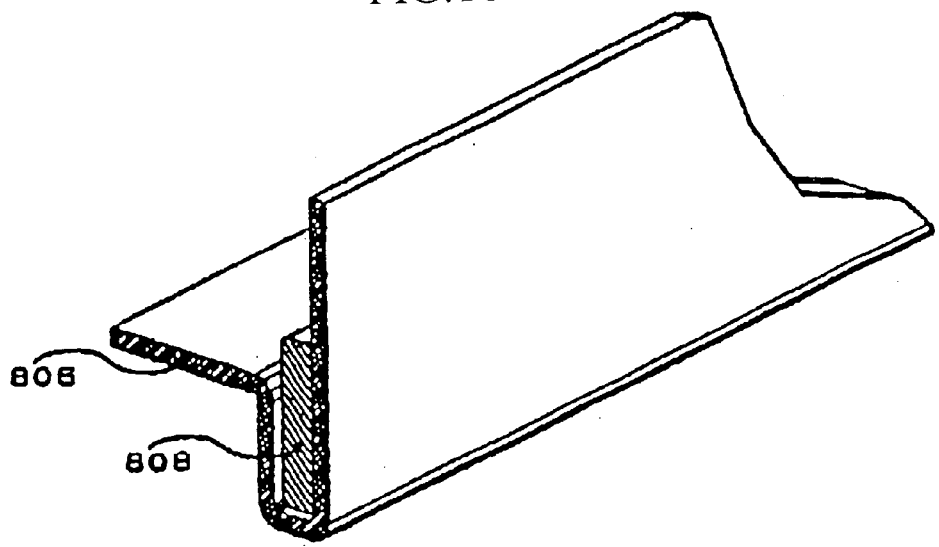
Figure 12:
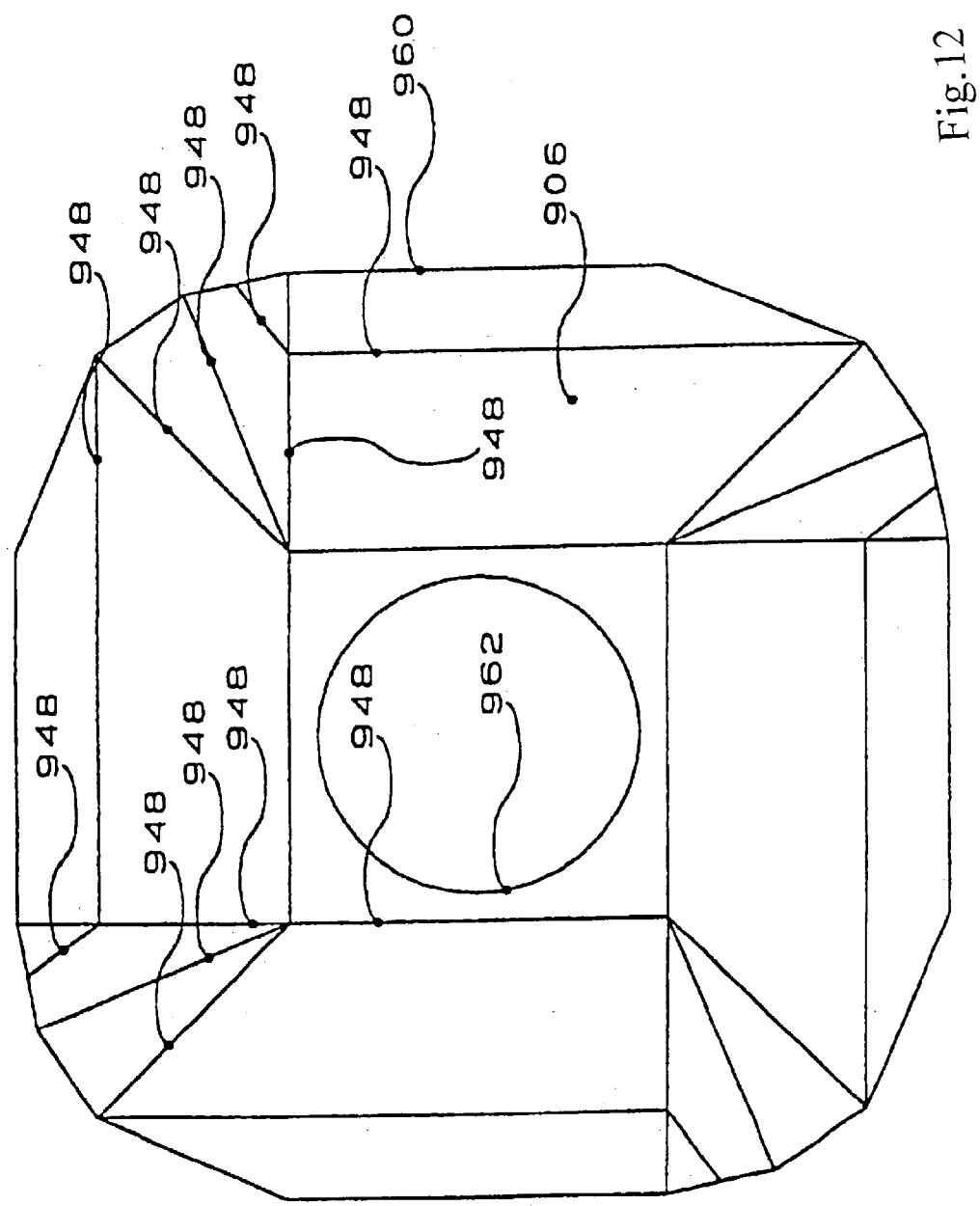
Figure 13:
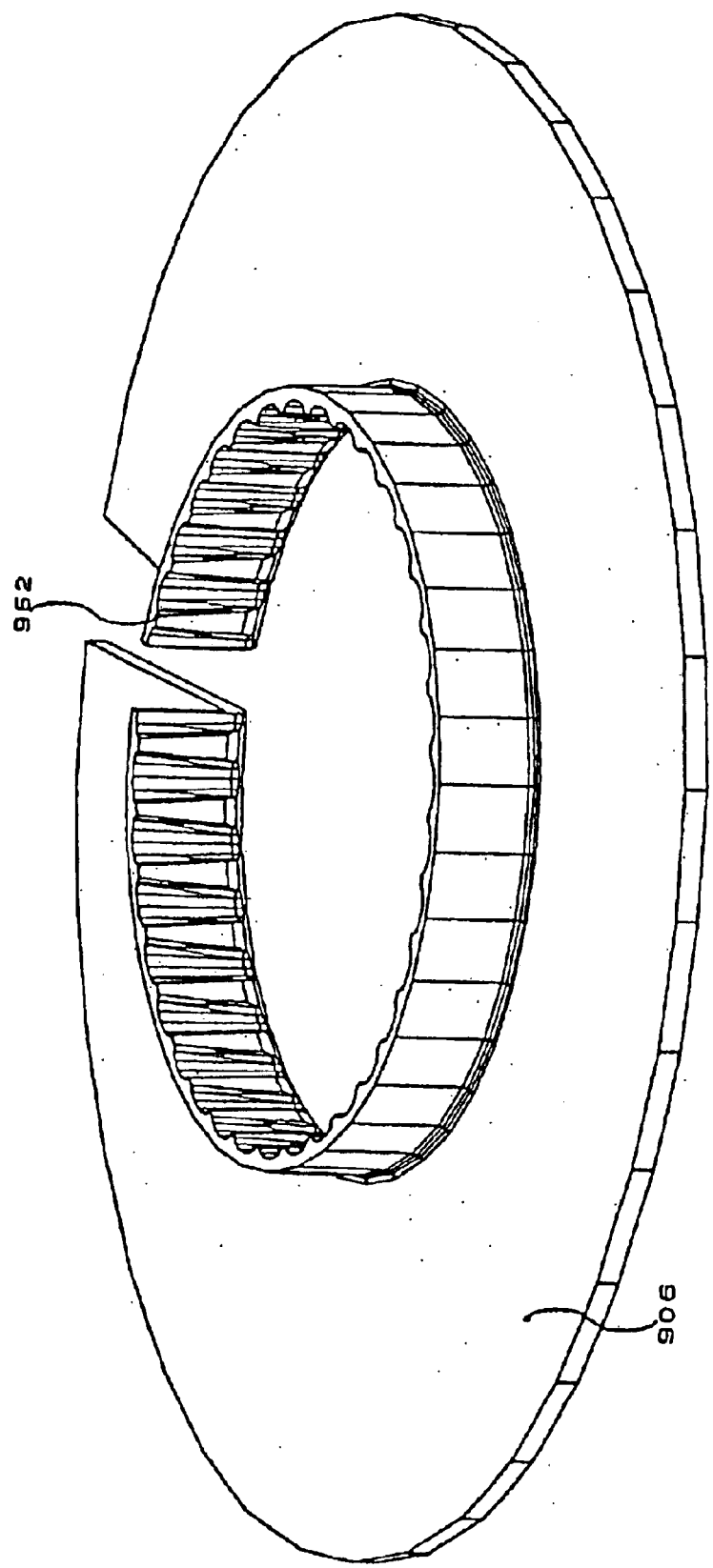
Figure 14:
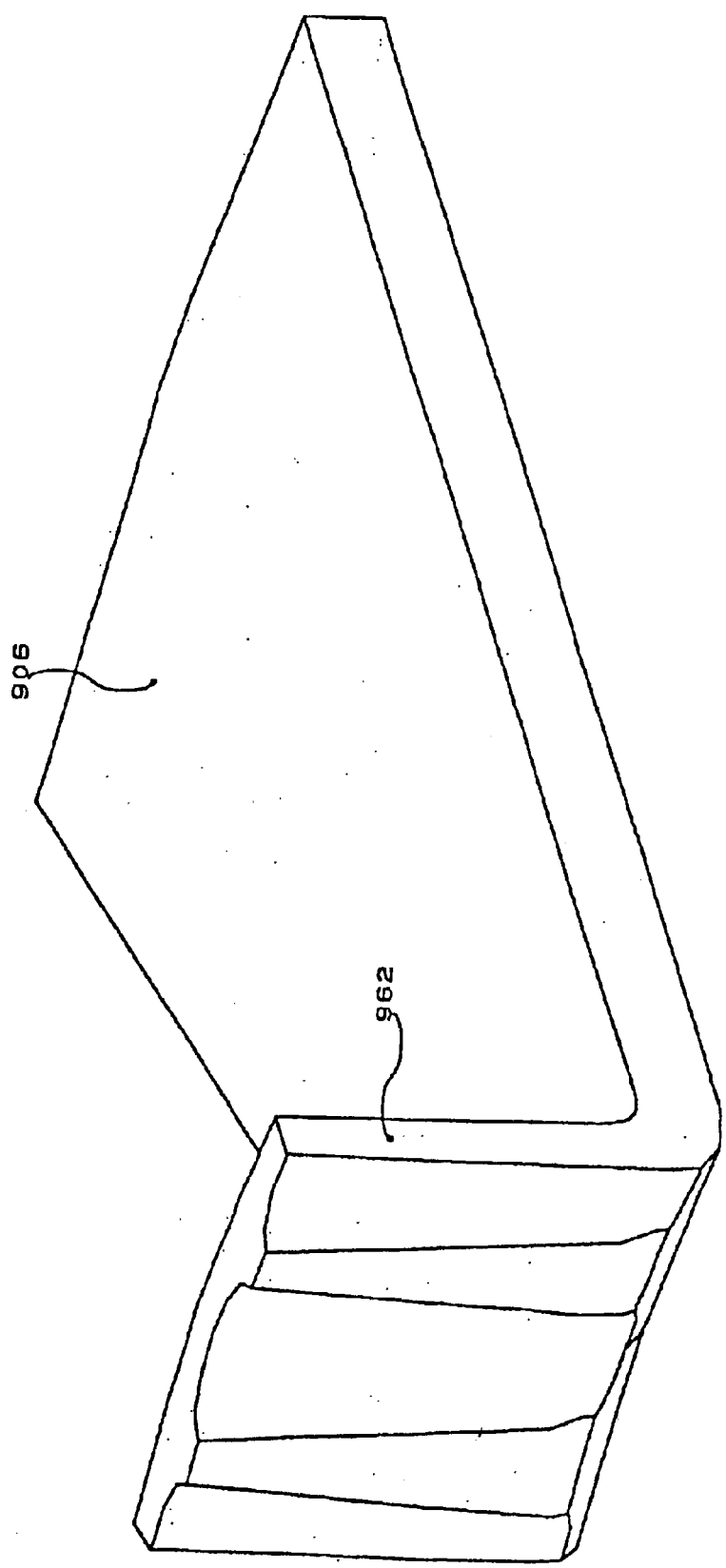
Figure 15:
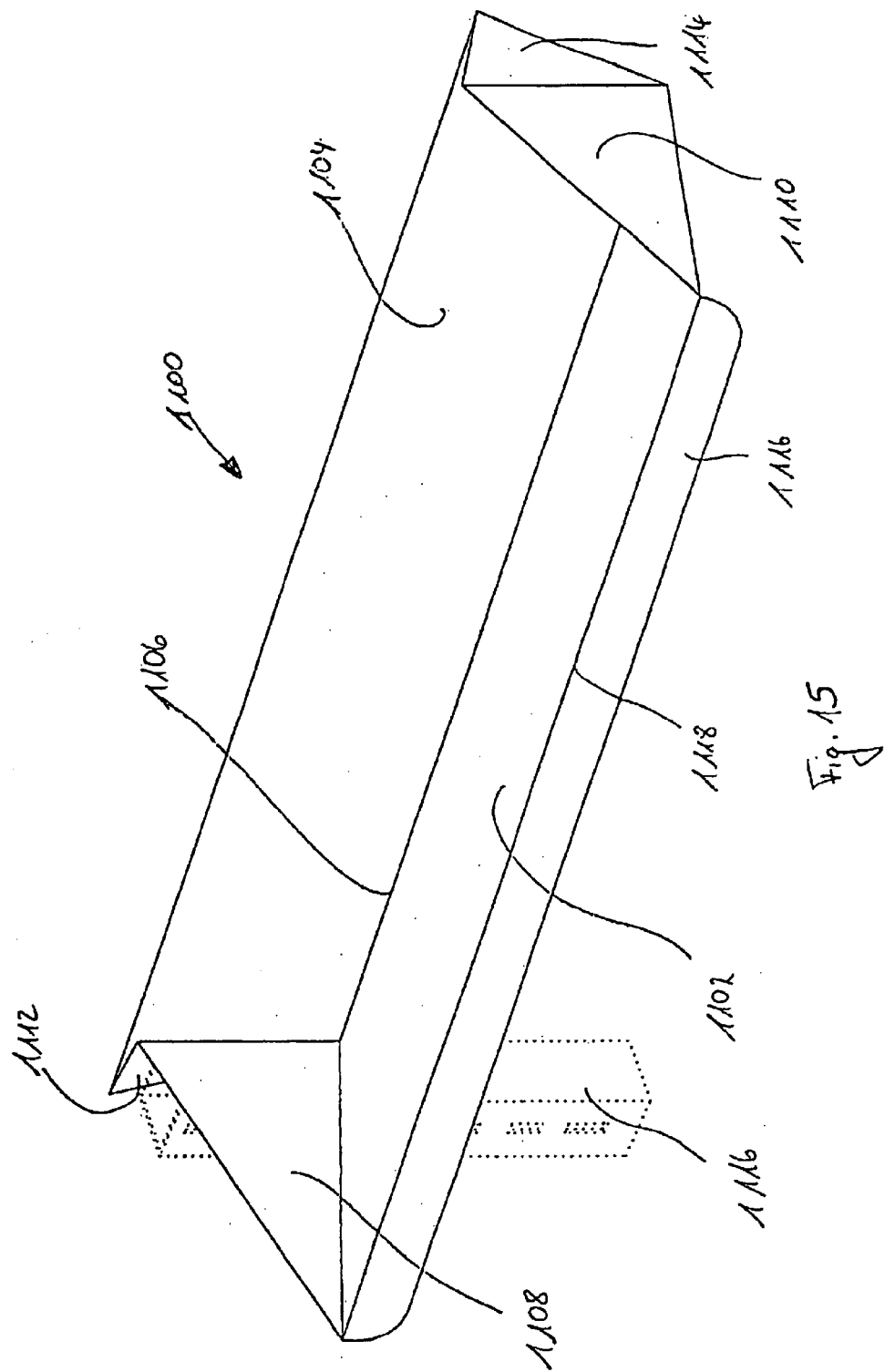
Figure 16:
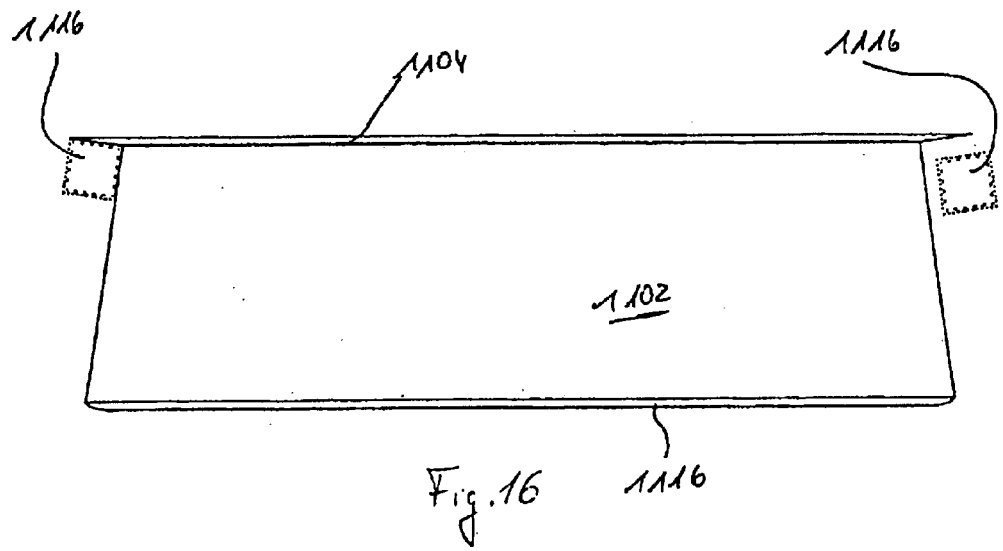
Figure 17:
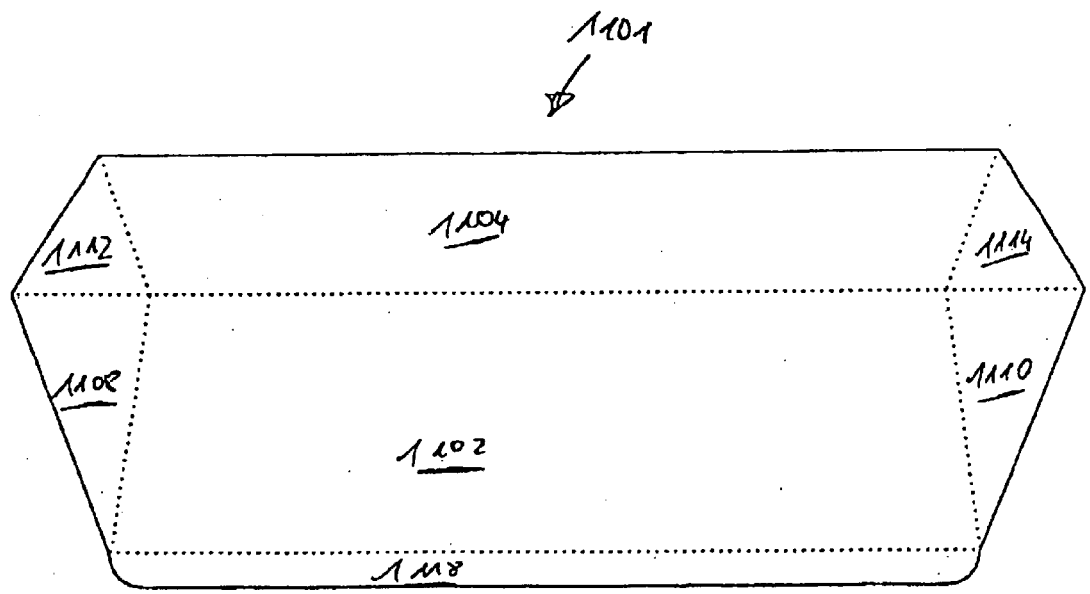
Figure 20:
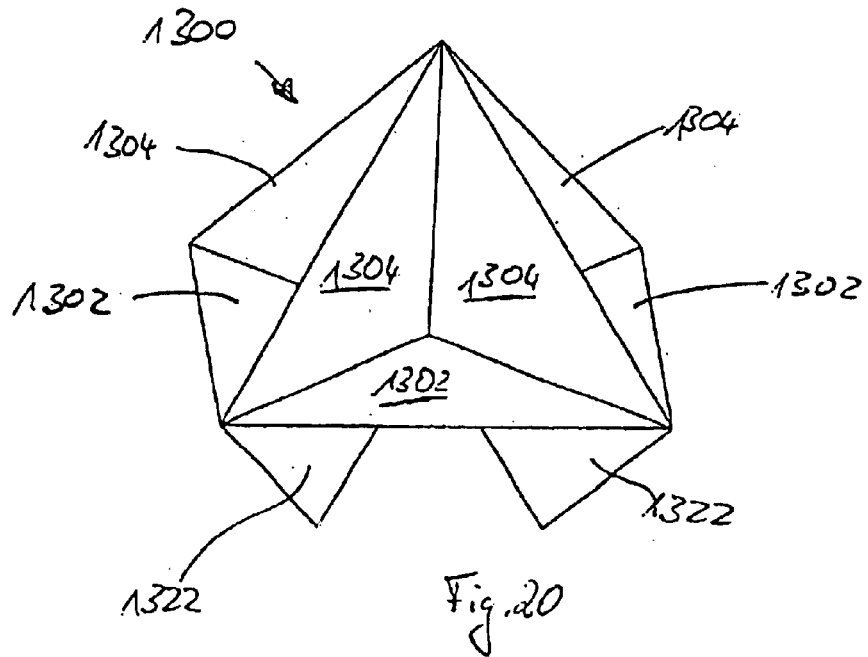
Figure 21:
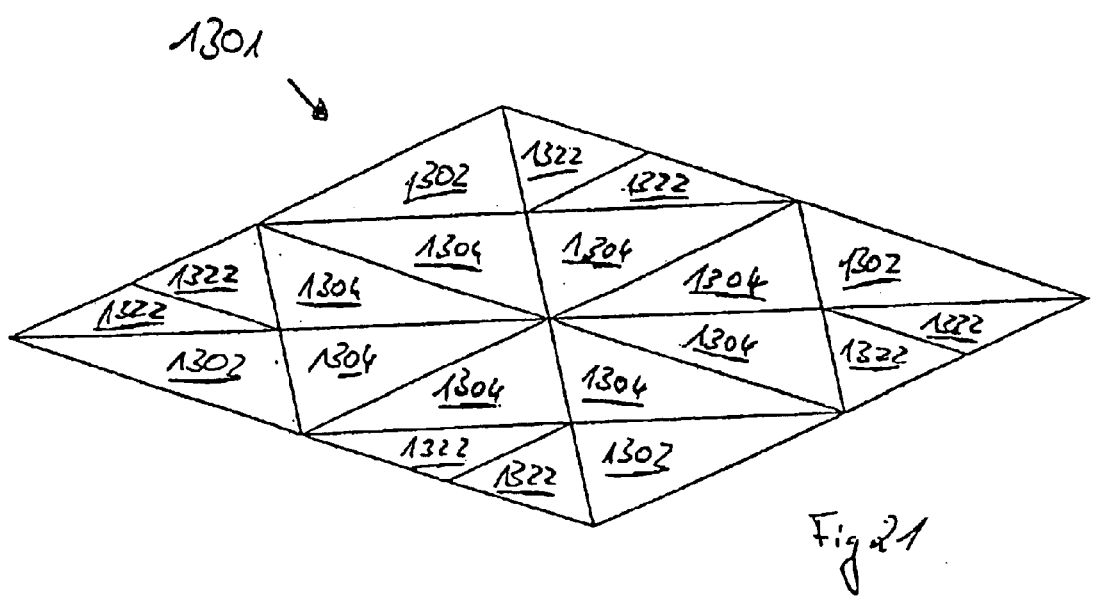
Figure 22:
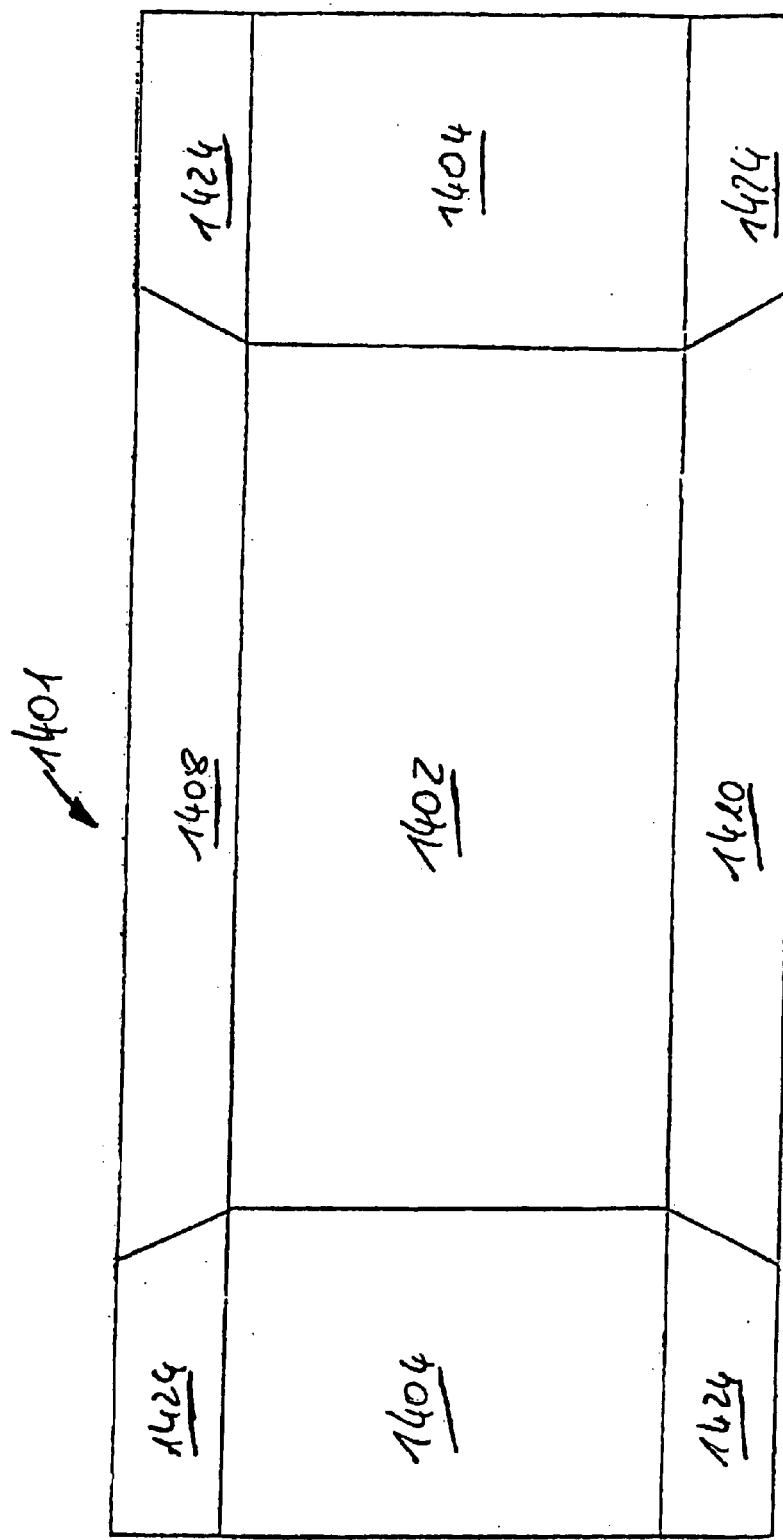
Figure 23:
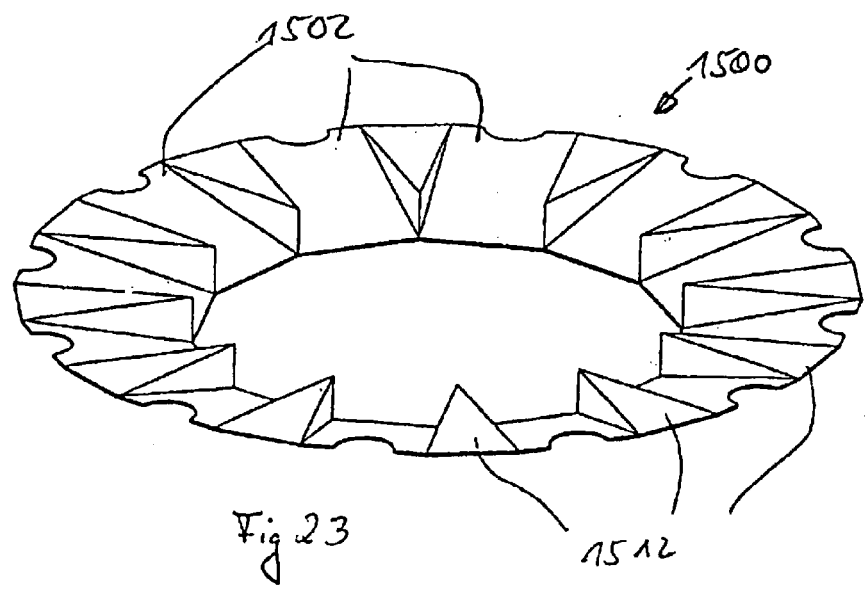
Figure 24:
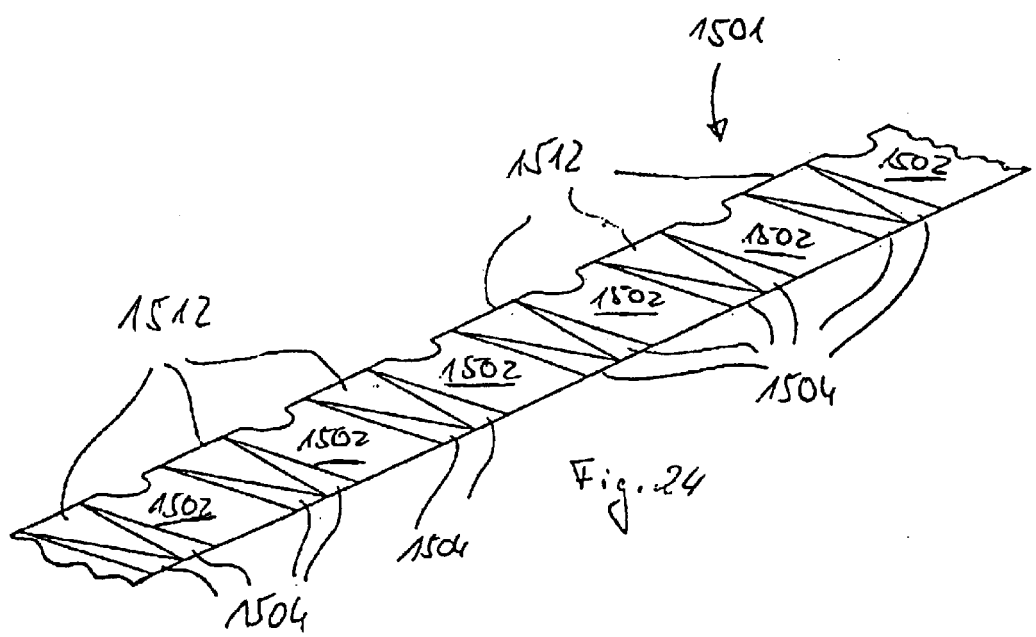
Figure 25:
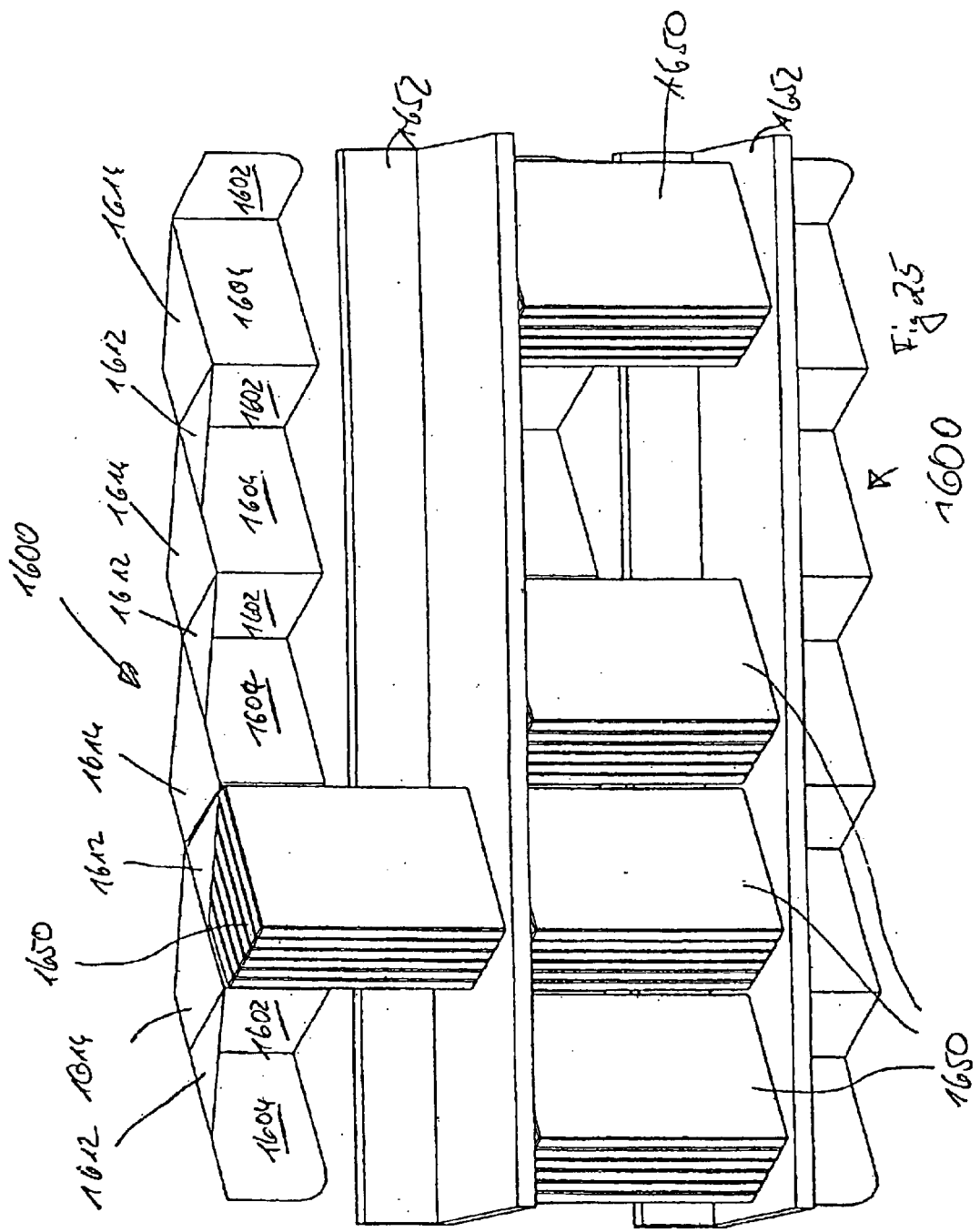
Figure 26:
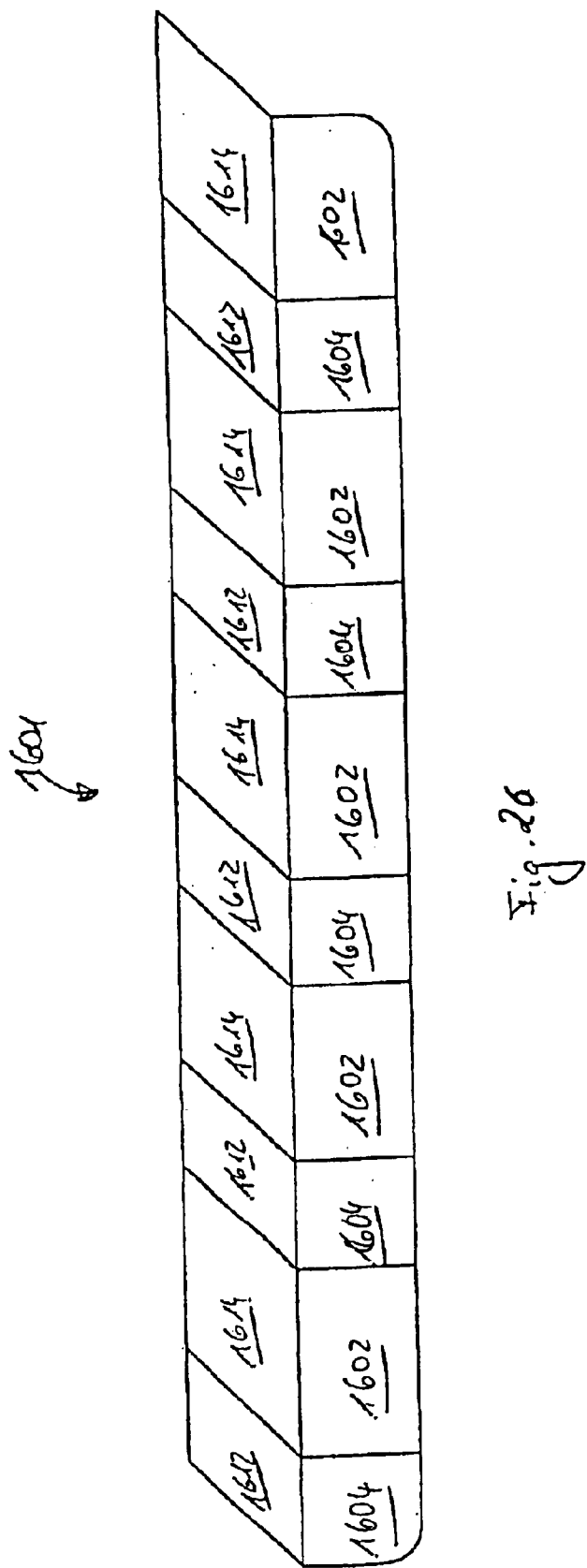
Figure 27:
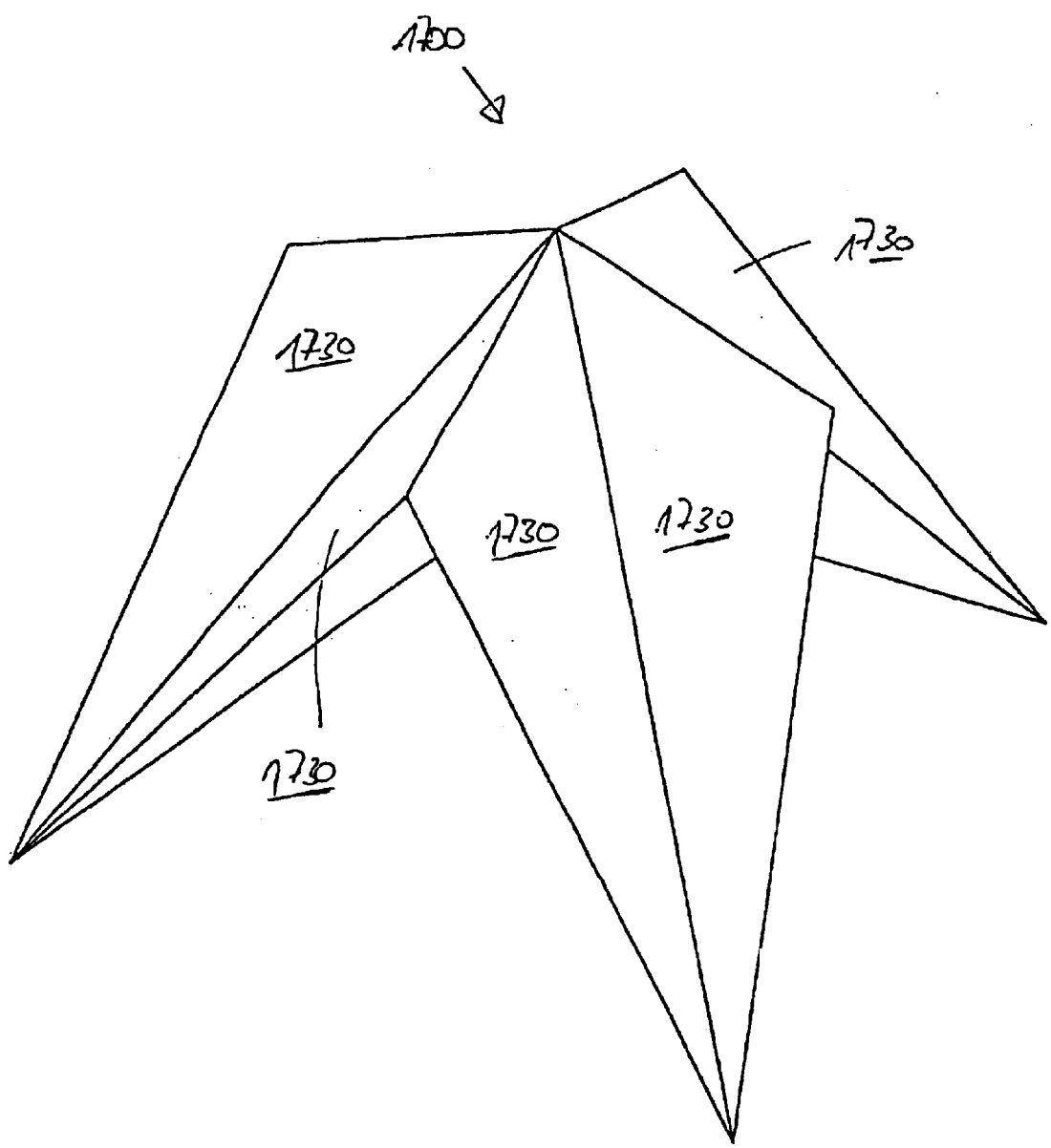
Figure 23:
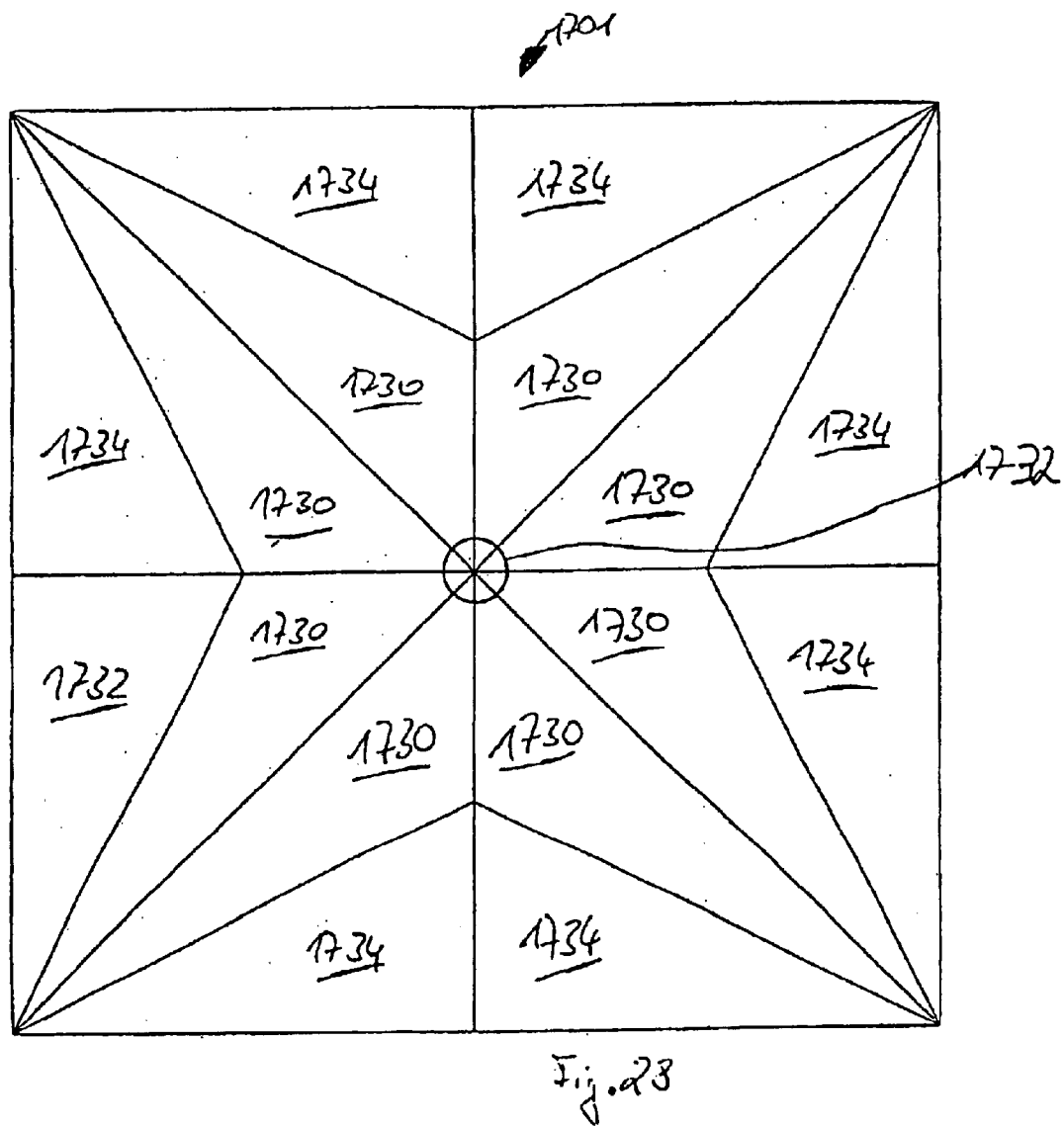

FIG. 8 ia a schematic view of a material blank during the heating phase;

FIG. 9 is a view of the material blank of FIG. 8 after a free upsetting step performed in accordance with the method of the invention;

FIG. 10 is a view of a material blank accommodating a component part;

FIG. 11 is a view of a material blank having a groove for accommodating damping elements;

FIG. 12 is a view of a blank for a three-dimensional shaped body for use as a display stand or rack;

FIG. 13 is a view of a hub-like central area of a shaped body produced from the blank shown in FIG. 12 and FIG. 14 is an enlarged view of a portion of the shaped body part cut out of FIG. 12;

FIG. 15 is a perspective view of the shelf bottom of a display furniture item of the invention, formed as a shelf;

FIG. 16 is a top view of said shelf bottom shown in FIG. 15;

FIG. 17 is view of a blank for the shelf bottom shown in FIGS. 15 and 16;

FIG. 18 is a view of a display furniture item of the invention in the form of a U-shaped frontal presenter;

FIG. 19 is a view of the blank for the display furniture item of FIG. 18;

FIG. 20 is a view of a display furniture item of the invention, in the form of a sales pyramid;

FIG. 21 is view of the blank for the display furniture item of FIG. 20;

FIG. 22 is a view of a first blank for a display furniture item of the invention, in the form of a table;

FIG. 23 is a view of a pie-like goods support for books;

FIG. 24 is a view of a portion of a blank for the goods support of FIG. 23;

FIG. 25 is a view of a saw-tooth insert for the stepped presentation of books, showing said insert fitted into an angular shelf;

FIG. 26 is a view of a blank for the insert shown in FIG. 25;

FIG. 27 is a perspective view of the foot of a leg of a display furniture item;

FIG. 28 is a view of a blank for the foot shown in FIG. 27; and

FIG. 29 is a view of a covering cap of the invention.

Figure 1:
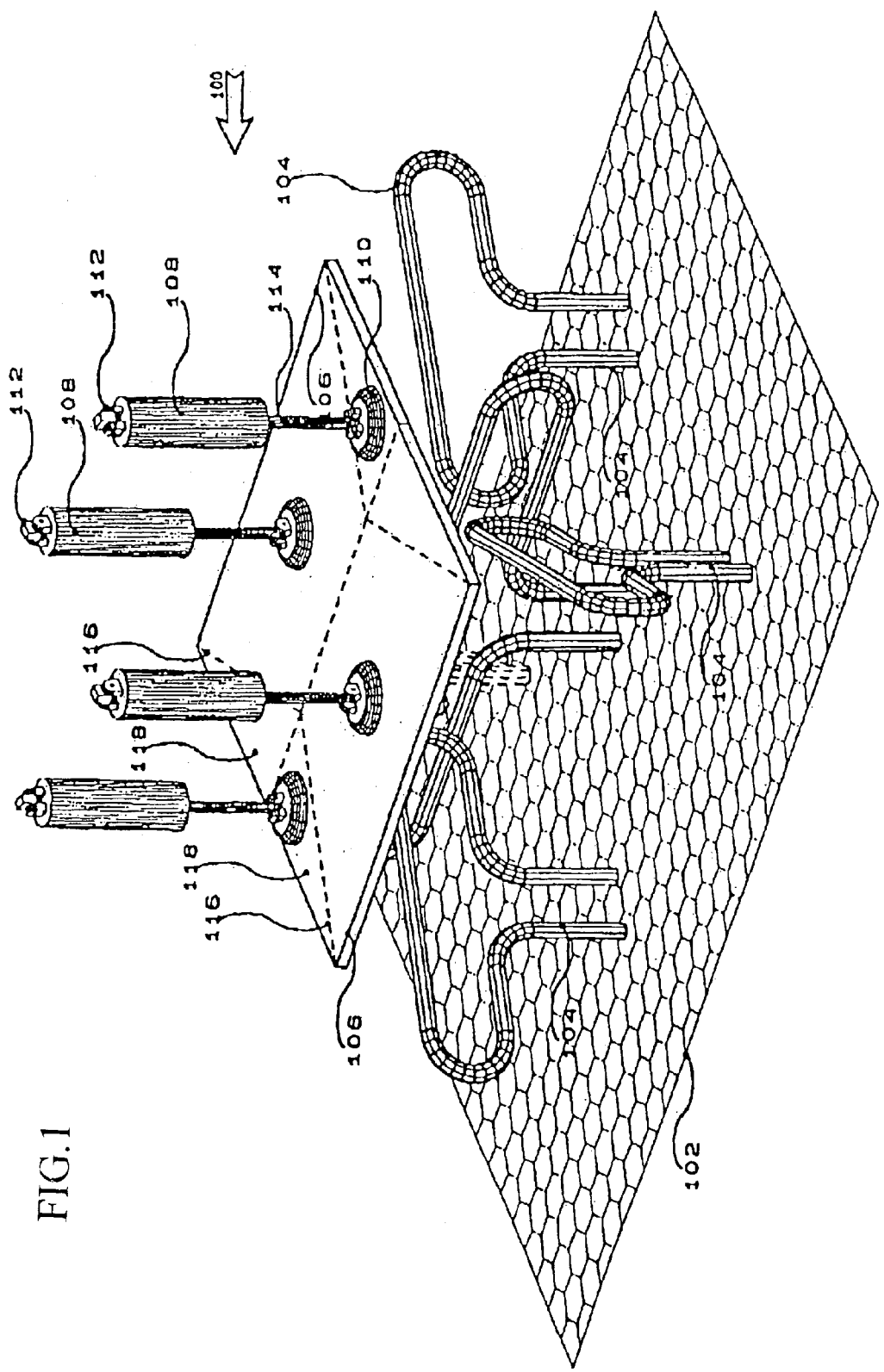
FIG. 1 is a view of a device for performing the method of the invention for producing one-piece, three-dimensional shaped bodies, with a material blank being clamped therein before bending.

The device 100 of FIG. 1 for freely bending a planar material blank includes a stand 102 and a heating device 104, mounted on said stand 102, which is provided for heating regions of a planar material blank 106 of thermoplastic material.

For handling said material blank 106, piston-cylinder units 108 are provided above said heating device 104, on a frame (not shown), which units 108 can be shifted together in the vertical direction and hold the material blank 106 firmly in position by means of vacuum suction elements 110.

Figure 2:
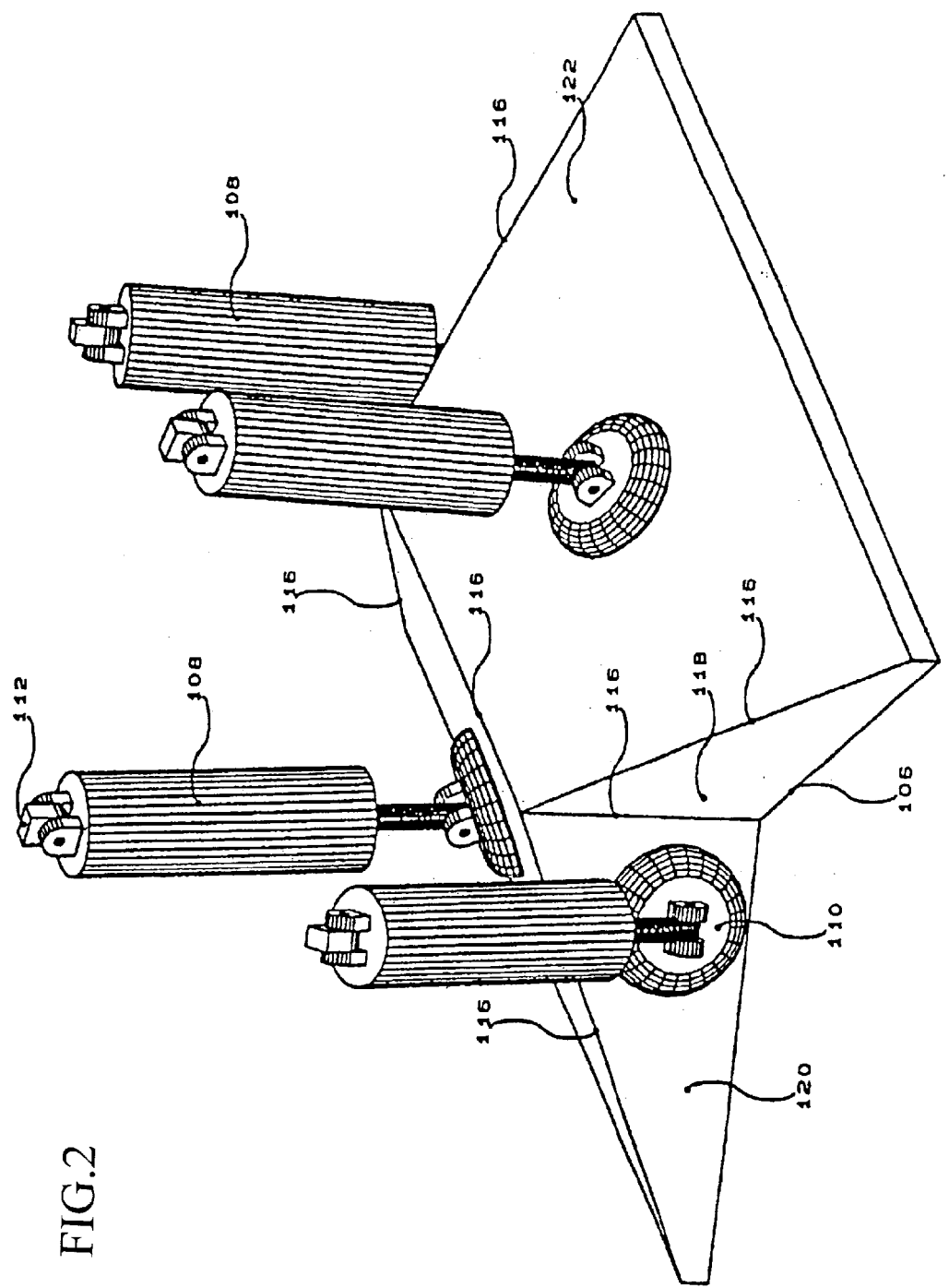
FIG. 2 is a view of the device of FIG. 1, showing the material blank after bending.

At the piston bottom, each said piston-cylinder unit 108 has a joint 112 and may be freely pivoted about the axis of the latter. Since the vacuum suction elements 110 are also pivotably mounted on the piston rods, the piston-cylinder units 108 will adapt to the position of the respective material sector of the material blank 106 during deformation of the latter, as may be gathered from the view of FIG. 2.

The vacuum suction elements 110 will engage in areas where the material blank 106 will not be heated—as may be noted from the bending lines 116 drawn in for reference purposes. It may also be seen from this view that not every section of said material blank 106 will be engaged by a piston-cylinder unit 108, via a vacuum suction element. Rather, two sections 118 will remain free. During deformation, these sections 118 will follow the respective adjoining regions 120 and 122, resp, in a way which is reminiscent of origami-style folding, with the material blank being folded after heating and then being kept during cooling until—once the material blank 106 has cooled down—the three-dimensional shape attained by the deformation process is preserved.

Figure 3:
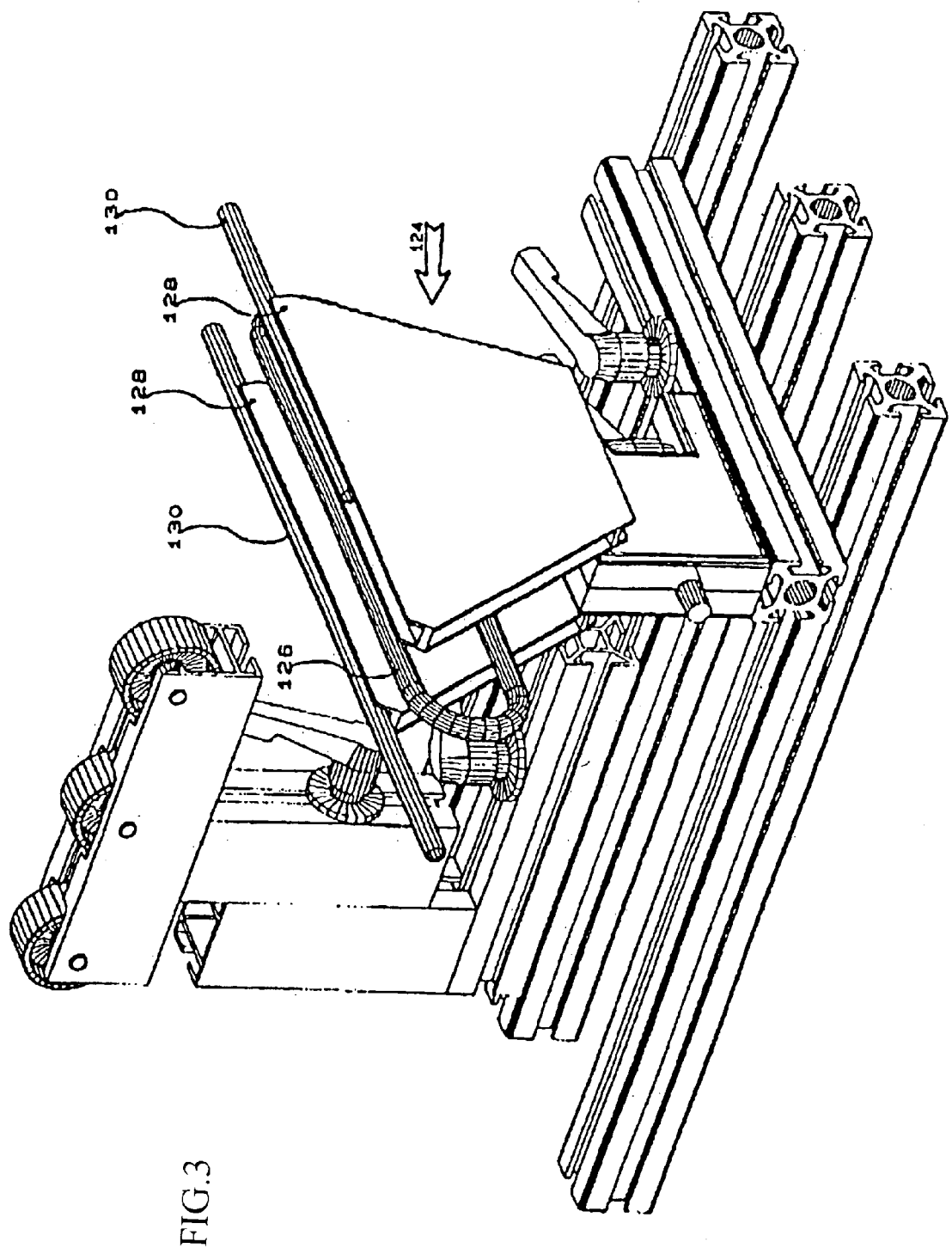
FIG. 3 is a view of a heating element for the device of FIG. 1 in accordance with a second embodiment.

FIG. 3 shows a heating element 124 for the device 100 of FIG. 1. Said heating element 124 includes a heating rod 126 which takes the form of electric resistance heating, just like the heating elements of heating device 104. Heating element 124, however, includes shielding elements 128, mounted in parallel to said resistance element 126, which are to restrict the heating of the material blank 106 to narrow regions required for the intended deformation. Provided at the top of said shielding elements 128 are sealing elements 130 of heat-resistant material which are to suppress any heat exchange due to convection.

Figure 4:
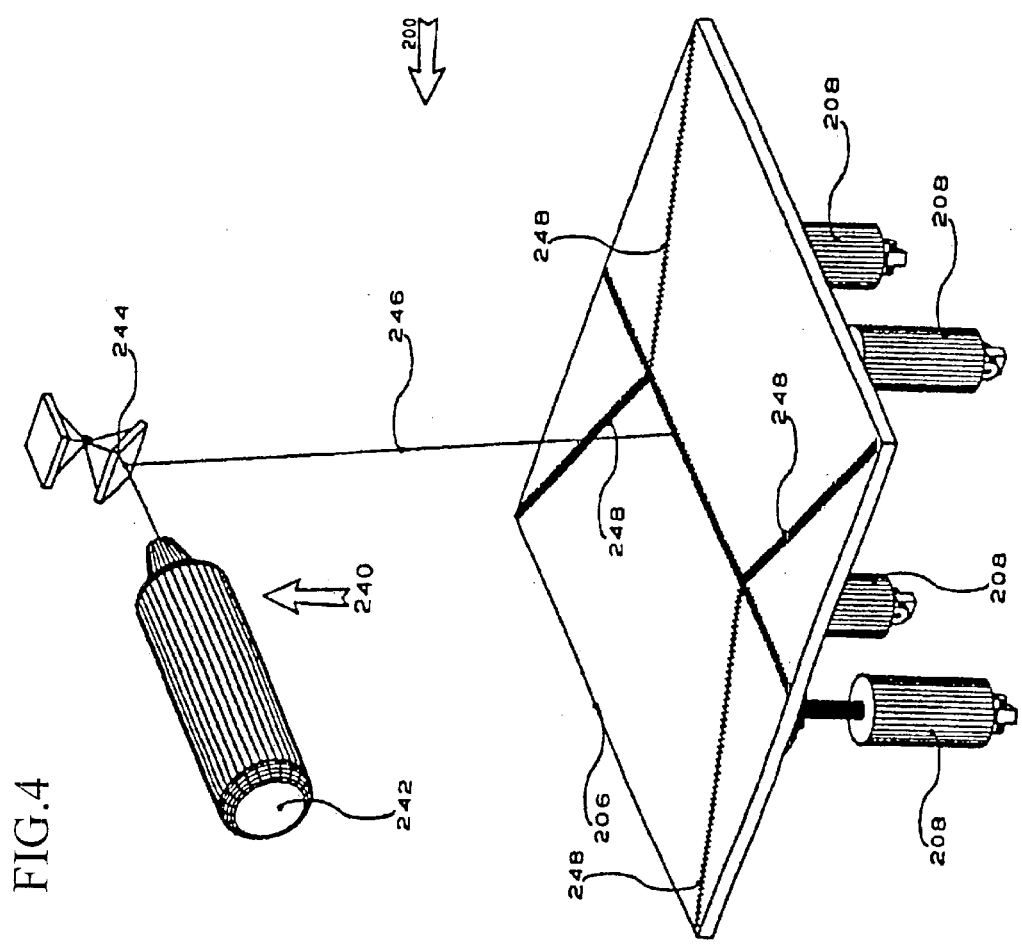
FIG. 4 is a view of a device for performing the method with a laser heating device.

FIG. 4 is a view of a second embodiment of a device 200 according to the invention. Said device 200 differs from the device 100 of the first embodiment in that it includes a laser heating device 240 provided for heating material regions and in that the piston-cylinder units 208 are positioned differently, i.e. underneath the material blank 206 to be deformed, in contrast to device 100. Since the design of the piston-cylinder units 208 and the fact that they are mounted on a stand via joints is identical to the design of the piston-cylinder units 108 and the way these are mounted, reference is made to the corresponding description.

The laser heating device 240 provided in the device 200 for freely bending substantially planar material blanks 206 includes a stationary laser 242 as well as a movably mounted mirror 244. Mirror 244, which is computer-controlled, will deflect the laser beam 246 in such a manner that a line pattern 248 reflecting the future bending edges is created on the material blank 206. In order to set the width of the heating regions along the lines of said line pattern 248, said laser beam 246 will move in pendulum fashion along the lines of said line pattern 248.

Figure 5:
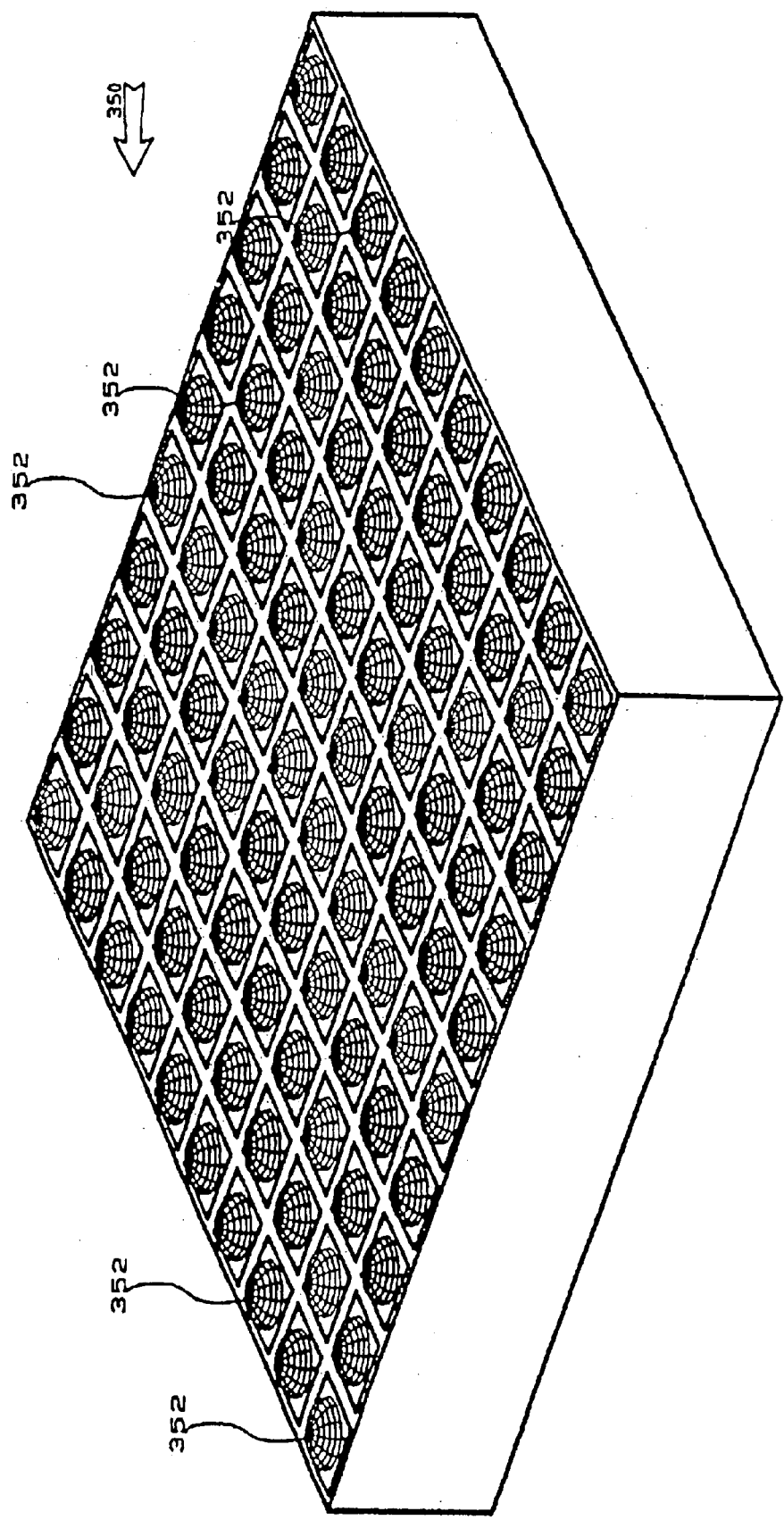
FIG. 5 is a view of a further embodiment of a heating device with selectively controllable heating elements.

FIG. 5 is a view of a heating device 350 which can be used as an alternative to heating device 104 in a device for free bending. Heating device 350 includes a plurality of individual heating pixels 352. Said heating pixels 352 are electric resistance elements framed in socket blocks of an edge length of 5 mm to 10 mm and combined to give a heating field which allows individual triggering of the individual heating pixels 352.

Figure 6:
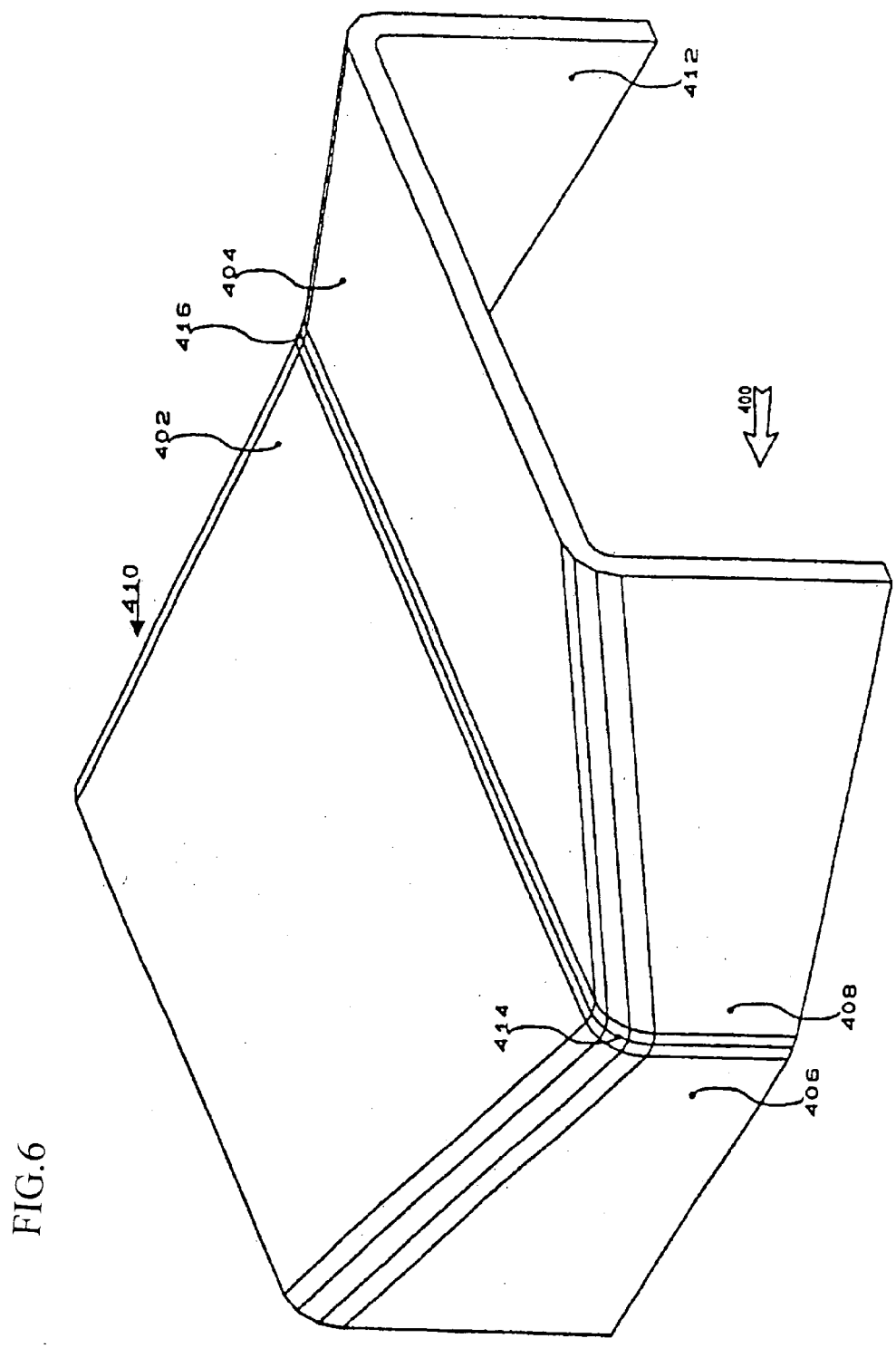
FIG. 6 is a view of a shaped body of the invention.

FIG. 6 is a perspective view of a shaped body 400 produced in accordance with the method of the invention. Said shaped body 400, which is made from a single material blank 401, consists of polymethylmethacrylate of a wall thickness of 6.5 mm and can be used for supporting, books. It has two display surfaces 402, 404 defining an angle therebetween, as well as four support surfaces 406, 408, 410, 412. The two display surfaces 402, 404 define an angle of 150°, whereas the angle between the two display surfaces 402, 404 and the respective adjoining support surface 406, 410 and 408, 412, respectively, amounts to approx. 90°. The angle between the respective adjoining support surfaces 406, 408 and 410, 412, respectively, is 130° and 135°, respectively. The fact that the regions where two display surfaces and two support surfaces come together were heated over a large surface area thereof during deformation, has resulted in rounded regions 414, 416 of the shaped body 400.

Figure 7:
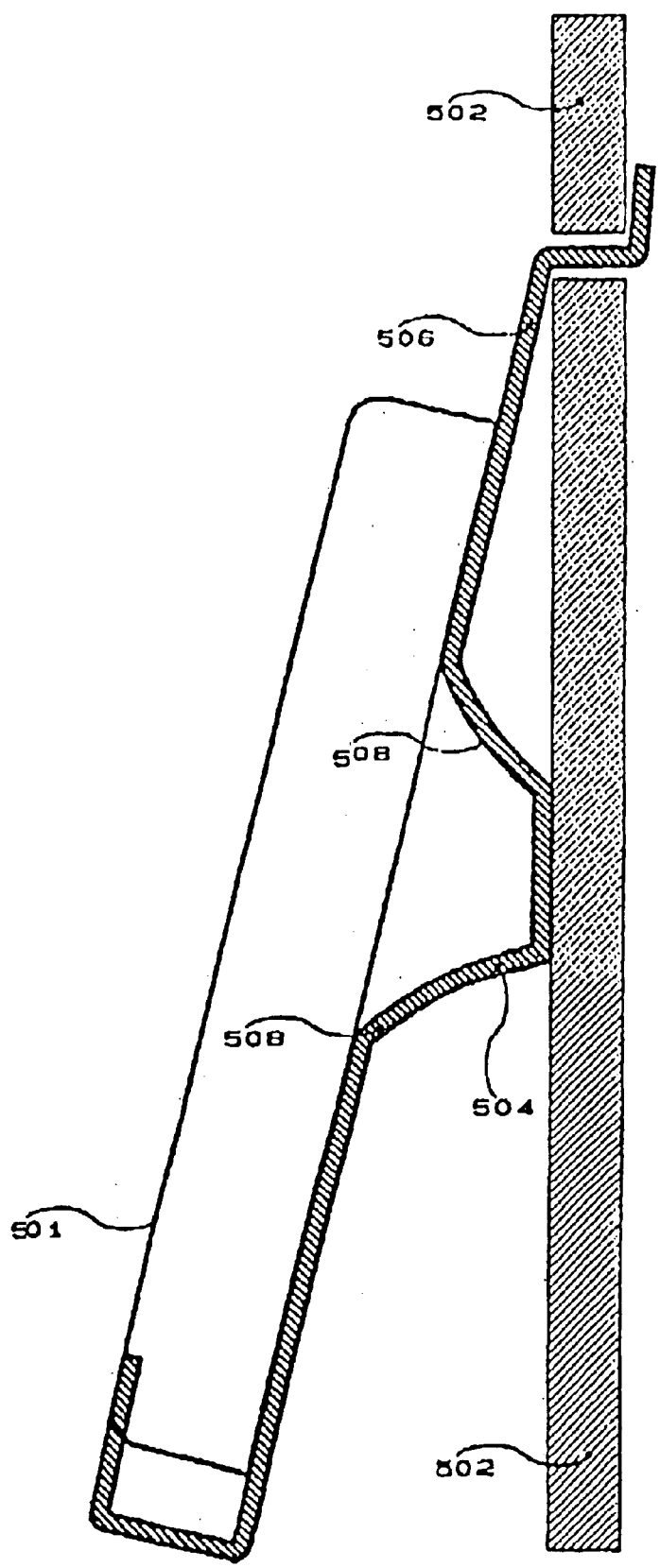
FIG. 7 is a view of a display bag of the invention.

FIG. 7 is a view of a display bag 500, produced from a material blank 501 in accordance with the method of the invention, for hanging up on a, perforated rail 502 of a presentation system. Said display bag 500 which is shown in sectional view and is made of polymethylmethacrylate of a wall thickness of 4 mm, includes a support foot 504 which was generated by embossing, by means of a pressure ram, a region heated over a large surface area. The fact that the diameter of the pressure ram used for embossing is only 40 to 70% of the diameter of the heated area, has resulted in the creation of large transient radii 508 at the bottom 506 of said display bag 500, at the area of the transition, to the support foot 504. If an annulus area is heated instead of a circular area, truncated embossed portions can be attained which will retain the original high surface quality in the area of the truncated terminal surface.

FIGS. 8 and 9 illustrate how ribs 608 may be formed in a material blank 606 by heating and subsequent upsetting in the plane of the material blank 606 as indicated by arrows A of FIG. 9.

FIGS. 10 and 11 show further possible applications of the method of the invention. In this case, a U section 708 of a metallic material has been embossed into a material blank 706 (FIG. 10) of which a wide region has been heated. Said U section 708 includes longitudinal slots 710 for accommodating joining elements. Owing to this kind of deformation process, said U section 708, which was used instead of a pressure ram during deformation, will be partially enclosed by said material blank 706, and will thus remain attached to said material blank 706 without any additional joining means.

FIG. 11 shows that the method of the invention may also be used for forming beads in a material blank 806 for accommodating damping profiles 808, made of e.g. sponge rubber.

FIGS. 12 to 14 are views of a material blank for a shaped body to be used as the bottom of a display system, as well as of portions of said material blank after deformation steps have been performed. FIG. 12 is a view of the line pattern 948 along which the material is heated. In order to avoid any further working steps after the deformation process, the material blank 906 has been cleanly cut off at its circumference 960 and at the edge of an internal opening 962.

FIGS. 13 and 14 illustrate how the edge of said internal opening 962 was created by the deformation step. By bending up from the plane of the material blank 906, of which only a portion is shown, a hub-like design is created which serves for accommodating a support column.

FIGS. 15 to 17 are views of a shelf bottom 1100 of a display furniture item. Said shelf bottom 1100 is made of a substantially planar material blank 1101 of polymethylmethacrylate by folding about heated bending lines, and includes a display surface 1102 as well as a first support surface 1104. A first bending line 1106 which is linear extends between said display surface 1102 and said first support surface 1104. The angle between said planar display surface 1102 and said likewise planar support surface 1104 is between approx. 70° and 80°, preferably 75°.

In order to increase the carrying capacity of the shelf bottom 1100, second support surfaces 1108, 1110 are provided which—as viewed in the longitudinal direction of the shelf bottom 1100—contact and adjoin said display surface 1102 at its front and rear ends, are positioned at right angles to said display surface 1102 and are connected to said support surface 1104 via connecting surfaces 1112, 1114. While display surface 1102 and support surface 1104 are rectangular or slightly trapezoidal, second support surfaces 1108, 1110 and connecting surfaces 1112, 1114 are triangular in shape. This, and the fact that connecting surfaces 1112, 1114 extend almost in parallel to support surface 1104, gives the shelf bottom a roof- or desk-like appearance in total. The roof- or desk-like design in which the second support surfaces 1108, 1110 enclose a right angle with the respective adjoining connecting surfaces 1112 and 1114, respectively, makes the shelf bottom 1100 easily mountable on square posts or legs 1116 of a display furniture item.

In order to facilitate the attachment of marking or labeling means, the shelf bottom additionally has a marking surface 1118 which is connected to display surface 1102 via a bending line 1120 and projects therefrom at an angle of approx. 110°.

FIGS. 18 and 19 are perspective views of a U-shaped frontal presenter 1200 as well as of a blank 1201 for its production. Said frontal presenter 1200 has various display surfaces 1202, each in the form of planar rectangles and extending in parallel to each other. These display surfaces are connected to each other via support surfaces 1204 which are likewise planar and rectangular in shape. Further support surfaces 1205 serve as a foot or pedestal. Furthermore, auxiliary surfaces 1207 are provided that have a reinforcing effect on the structure which is stair-like in its total appearance. Said auxiliary surfaces 1207 partially lie upon each other, in the form of a doubling. Provided above the topmost display surface 1202 is a marking or labeling surface 1218.

Said frontal presenter 1200 consists of polymethylmethacrylate (PMMA), with the material blank being imprinted on its one side in such a way that the bottom and/or rear sides bear the coating. During production of the frontal presenter 1200 from the planar material blank 1201 shown in FIG. 19, said material blank 1201 was heated only along the various bending lines 1206, of which only a few have been exemplarily designated with a reference character, and the force was made to act on the blank, i.e. print-free, side of the material blank 1201 via vacuum suction elements so as to leave no visible device marks on the frontal presenter 1200.

FIGS. 20 and 21 are perspective views of a display furniture item in the form of a sales pyramid 1300 as well as of a blank 1301 for its production. Said sales pyramid 1300 has four display surfaces 1302 which are formed as planar sheet-like rectangular triangles and extend in a common plane. Said display surfaces 1302 are connected via support surfaces 1304 which are likewise formed as rectangular triangles, pairs of which lie upon each other, and—as viewed from above—form a cross. Said support surfaces 1304 extend perpendicularly to said display surfaces 1302, with the individual support surfaces 1304 and said display surfaces 1302 being of identical size.

Extending beneath said display surfaces 1302 are foot or bottom surfaces 1322 which are likewise rectangular triangles, arranged in pairs lying upon each other, extending in the planes of the support surfaces 1304. Since the superficial contents of the triangles of said foot or bottom surfaces 1322 amount to only half as much as the superficial contents of said display surfaces 1302 and said support surfaces 1304, the foot elements formed from said foot surfaces 1322 are of a lower height than the support surfaces 1304.

The sales pyramid 1300 is made of polymethylmethacrylate (PMMA) which is imprinted on its reverse. Since the support surfaces 1304 and the foot surfaces 1322 lie upon each other in a double arrangement, and the display surfaces 1302 will only bear a load on one side, the material blank 1301 will only be imprinted on on one side. In use, the imprinted portion will be on the interior or at the bottom and thus be protected from scratching.

FIG. 22 is a view of a blank 1401 for a display furniture item in the form of a table. Adjoining said rectangular planar display surface 1402 and extending on opposite sides thereof are two first support surfaces 1404 as well as two second support surfaces 1408, 1410. When the table is ready for use, the two first support surfaces 1404 will extend in planes that are parallel to each other, and will at the same time be perpendicular to said display surface 1402. In order to lend this structure stability and to avoid any bending of the display surface 1402, the second support surfaces 1408, 1410 extend under an angle of approx. 25° to the plane of the display surface 1402. The second support surfaces 1408, 1410 are trapezoidal in shape, in contrast to the first support surfaces 1404. Connecting surfaces 1424 which connect the first support surfaces 1404 with the second support surfaces 1408 and 1410, respectively, serve for toughening and stiffening the structure. The reverse of the blank is imprinted on.

FIGS. 23 and 24 are views of a pie-like goods support 1500 for books as well as of a blank 1501 for its production. In this goods support 1500, display surfaces 1502 are connected via triangular support surfaces 1504 and connecting surfaces 1512 in such a way that the goods support 1500 forms an annular three-dimensional structure.

FIGS. 25 and 26 are views of saw-tooth inserts 1600 for the stepped presentation of books 1650, showing such inserts fitted into angular shelves 1652. The saw-tooth inserts include display surfaces 1602 and support surfaces 1604 as well as connecting surfaces 1612, 1614. Similar to the auxiliary surfaces 1207 of the frontal presenter illustrated by the views of FIGS. 18 and 19, the connecting surfaces 1612, 1614 are partially arranged in parallel on top of each other.

FIGS. 27 and 28 are perspective views of a foot 1700 of a post or leg of a display furniture item as well as of a blank 1701 for the foot shown in FIG. 27. This foot 1700 has eight support surfaces 1730, each of triangular shape, arranged in star-shaped fashion around a post support opening 1732. Connecting surfaces 1734 folded inwards serve for stiffening the structure.

Said foot 1700 is made of a material blank of transparent polymethylmethacrylate (PMMA) and its interior side is imprinted.

The view of FIG. 29 shows a blank 1801 for a covering cap for covering a display surface of a display furniture item. Support surfaces 1842, 1844, 1846, 1848 adjoin a centrally located cover surface 1840, said surfaces being each connected to said cover surface via a curved bending line 1850, 1852, 1854, 1856. Triangular support surfaces 1858 which are folded inwards, will stiffen the structure of the covering cap which is curved in use. The covering cap is made of polymethylmethacrylate (PMMA) and completely transparent.

What is claimed is:

1. A method for producing one-piece, three-dimensional shaped bodies from a substantially planar material blank which is resistant to bending at room temperature, in which the material blank is clamped in position with at least one clamping device, heated with at least one heating means along deformation lines extending in a narrow heating region, and then deformed along said deformation lines in this clamped state, wherein said deformation is performed freely in space, without the use of a stop edge, indentation or die, by maneuvering in space said clamping device relative to said deformation lines, with the force being introduced in non-heated regions, and wherein the thus attained three-dimensional shape is permanently preserved after cooling, during which cooling the material blank is kept in the attained three-dimensional shape.

2. The method as claimed in claim 1 wherein said deformation comprises a bending along bending lines, wherein said bending is realized by maneuvering in space, relative to said bending lines, the clamping device with the material blank clamped thereto.

3. The method as claimed in claim 1 or 2 wherein, while in the clamped state for deformation along said deformation lines, said material blank is heated in at least one wide heating region thereof so as to create extension regions and/or embossing regions.

4. The method as claimed in one of claims 1 to 2 wherein, for producing projections in the three-dimensional shaped part, a pressure ram engages in the at least one heating region, which ram is smaller in dimension in the direction of the plane of the material blank than said heating region.

5. The method as claimed in one of claims 1 to 2 wherein, the heating temperature and/or the width of the heating regions along the deformation line varies so as to allow a well-aimed shaping of resulting edges as a function of the kind of material blank to be deformed as well as of the material thickness.

6. The method as claimed in claim 1 or 2 wherein, during heating, a cooling means is additionally applied to at least one region adjacent to the narrow heating spots.

7. The method as claimed in claim 2 wherein, said material blank is bent along at least one curved bending line so as to create a curved surface in the shaped part.

8. The method as claimed in claim 1 or 2 wherein, the course of the bending operation, a step takes place, wherein a heating means is applied to the material blank, in which upsetting deformations of the material thereby form reinforcing ribs at the deformation lines.

9. The method as claimed in claim 1 or 2 wherein, by means of hot forming, material extensions forming U-shaped or omega folds are created at the deformation lines.

10. The method as claimed in claim 1 or 2 wherein, said material blank is provided with a structure or a surface profile on one or both sides thereof.

11. The method as claimed in claim 1 or 2 wherein, before the heating and deformation operations, recesses or a grid of recesses are formed in the material blank.

12. The method as claimed in claim 1 or 2 wherein, before the heating and deformation operations, prints or engravings are provided on the material blank.

13. The method as claimed in claim 1 or 2 wherein, before the heating and deformation operation, components or component packages are provided on the material blank.

14. A shaped body, produced in accordance with the method as claimed in one of claims 1 to 2, wherein said material blank (106;206;401;501;606;706;806;906) is substantially made of a thermoplastic plastic material, in particular substantially of a homogenous or modified polymethylmethacrylate (PMMA).

15. The shaped body as claimed in claim 14, wherein said material blank (106;206;401;501;606;706;806;906) is of a material thickness of 3 mm to 10 mm, preferably 4 mm to 7 mm specially 6.5 mm.

16. A display bag for hanging up in a perforated rail of a presentation system, produced in accordance with the method as claimed in one of claims 1 to 2, wherein said material blank (501) is substantially made of a thermoplastic plastic material, especially substantially of a homogenous or modified polymethylmethacrylate (PMMA).

17. The display bag as claimed in claim 16, wherein the wall thickness of said display bag (501) is 3 mm to 10 mm, preferably 4 mm, in the non-deformed material regions.

18. A device for performing the method as claimed in one of claims 1 to 2, including a heating device (104;240) for heating material blanks (106;206;401;501;606;706;806;906) along one or plural deformation lines, at least one support device for fixing said material blank (501) in position, and at least one bending device for bending said material blank (501).

* * * * *

UNITED STATES PATENT AND TRADEMARK OFFICE
CERTIFICATE OF CORRECTION

PATENT NO. : 6,763,771 B1
DATED : July 20, 2004
INVENTOR(S) : Hannecke

It is certified that error appears in the above-identified patent and that said Letters Patent is hereby corrected as shown below:

Title page,
Item [54], delete ", SHAPED BODIES PRODUCED ACCORDING TO THE METHOD, DEVICE FOR CARRYING OUT THE METHOD, AND DISPLAY FURNITURE"

Column 3,
Line 42, delete "claims 1, 14, 16, 18, 29, 32 and/or 34" and insert -- claims 1, 14, 16 and/or 18 --

Column 11,
Line 45, delete "a," and insert -- a --

Column 14,
Line 67, delete "spots" and insert -- regions --

Column 15,
Line 4, delete "wherein, the" and insert -- wherein, in the --

Signed and Sealed this

Twenty-eighth Day of December, 2004

JON W. DUDAS
*Director of the United States Patent and Trademark Office*